United States Patent
Shehata et al.

(10) Patent No.: US 9,841,761 B2
(45) Date of Patent: Dec. 12, 2017

(54) SYSTEM AND METHOD FOR CONTROLLING UNMANNED AERIAL VEHICLES

(71) Applicant: AERYON LABS INC., Waterloo (CA)

(72) Inventors: Kareem Shehata, Waterloo (CA);
Matthew Thiffault, Waterloo (CA);
James Thomas Pike, Waterloo (CA);
Michael Peasgood, Waterloo (CA);
Thomas Nagy, Waterloo (CA)

(73) Assignee: AERYON LABS INC., Waterloo (CA)

( * ) Notice: Subject to any disclaimer, the term of this patent is extended or adjusted under 35 U.S.C. 154(b) by 24 days.

(21) Appl. No.: 14/398,857

(22) PCT Filed: May 6, 2013

(86) PCT No.: PCT/CA2013/000442
§ 371 (c)(1),
(2) Date: Nov. 4, 2014

(87) PCT Pub. No.: WO2013/163746
PCT Pub. Date: Nov. 7, 2013

(65) Prior Publication Data
US 2015/0142211 A1    May 21, 2015

Related U.S. Application Data

(60) Provisional application No. 61/643,025, filed on May 4, 2012.

(51) Int. Cl.
*G05D 1/00* (2006.01)
*H04N 7/18* (2006.01)
(Continued)

(52) U.S. Cl.
CPC ......... *G05D 1/0027* (2013.01); *B64C 39/024* (2013.01); *G05D 1/0044* (2013.01);
(Continued)

(58) Field of Classification Search
None
See application file for complete search history.

(56) References Cited

U.S. PATENT DOCUMENTS 8,068,949 B2 * 11/2011 Duggan ............... G05D 1/0061
701/11
8,068,950 B2    11/2011 Duggan et al.
(Continued)

OTHER PUBLICATIONS

Girard, Border Patrol and Surveillance Missions using Multiple Unmanned Air Vehicles, Dec. 2004, IEEE, http://ieeexplore.ieee.org/stamp/stamp.jsp?tp=&arnumber=1428713.*
(Continued)

*Primary Examiner* — John R Olszewski
*Assistant Examiner* — David Merlino
(74) *Attorney, Agent, or Firm* — Norton Rose Fulbright Canada LLP; Niall Cooney

(57) ABSTRACT

A system is provided comprising a control station for remotely controlling unmanned aerial vehicles ("UAV"). The control station is configured to display vehicle status data received from each UAV, including displaying a location of each UAV in a single interface. Through the single interface, the control station may receive a control command input associated with one of the UAVs. The control station may transmit the received control command, or a command derived therefrom, to the respective UAV. The single interface may provide for a user to view and control flight operation of each of the UAVs independently through the single interface.

23 Claims, 36 Drawing Sheets

(51) Int. Cl.
*G08G 5/00* (2006.01)
*G08C 17/00* (2006.01)
*B64C 39/02* (2006.01)

(52) U.S. Cl.
CPC .......... *G08C 17/00* (2013.01); *G08G 5/0026* (2013.01); *G08G 5/0069* (2013.01); *H04N 7/181* (2013.01); *H04N 7/185* (2013.01); *B64C 2201/146* (2013.01); *G08C 2201/50* (2013.01)

(56) References Cited

U.S. PATENT DOCUMENTS

| | | | | |
|---|---|---|---|---|
| 8,990,002 | B1* | 3/2015 | Leonard | G01S 5/0284 701/300 |
| 9,108,729 | B2* | 8/2015 | Duggan | G05D 1/088 701/24 |
| 2005/0004723 | A1* | 1/2005 | Duggan | G05D 1/0061 701/24 |
| 2005/0231419 | A1* | 10/2005 | Mitchell | G08G 5/0026 342/36 |
| 2009/0219393 | A1* | 9/2009 | Vian | G08G 5/0086 701/23 |
| 2010/0001902 | A1* | 1/2010 | Smith | G01S 5/0294 342/357.48 |
| 2010/0042269 | A1* | 2/2010 | Kokkeby | G05D 1/0094 701/3 |
| 2010/0084513 | A1 | 4/2010 | Gariepy et al. | |
| 2010/0250022 | A1* | 9/2010 | Hines | G05D 1/0044 701/2 |
| 2010/0305778 | A1* | 12/2010 | Dorneich | G05D 1/0044 701/2 |
| 2011/0017863 | A1* | 1/2011 | Goossen | F41G 7/303 244/3.14 |
| 2012/0044710 | A1* | 2/2012 | Jones | B64C 39/024 362/470 |

OTHER PUBLICATIONS

Johnson, Rubin; Testing Adaptive Levels of Automation (ALOS) for UAV Supervisory Control; Mar. 2007; Air Force Research Laboratory; http://www.dtic.mil/docs/citations/ADA470315.*
Cummings, Mary; Predicting Controller Capacity in Supervisory Control of Multiple UAVs; Mar. 2008; IEEE Transactions of Systems, Man, and Cybernetics; vol. 38, No. 2; pp. 451-460; http://ieeexplore.ieee.org/stamp/stamp.jsp?arnumber=4445761.*
Written Opinion and International Search Report for PCT/CA2015/000442 dated Aug. 22, 2013.

* cited by examiner

SYSTEM AND METHOD FOR CONTROLLING UNMANNED AERIAL VEHICLES

CROSS REFERENCE TO RELATED APPLICATIONS

This application claims all benefit, including priority, of U.S. Provisional Patent Application Ser. No. 61/643,025, filed May 4, 2012, entitled USER INTERFACE ELEMENTS FOR CONTROLLING MULTIPLE UNMANNED AERIAL VEHICLES, the entire contents of which is incorporated herein by this reference.

FIELD OF THE INVENTION

The present invention relates generally to unmanned aviation. The present invention further relates to systems and methods for controlling unmanned aerial vehicles.

BACKGROUND OF THE INVENTION

An unmanned aerial vehicle ("UAV") does not have a human operator located at the UAV. It is desirable to be able to control the operation, including flight path, of a UAV remotely. Existing systems for remote control of UAVs may be difficult to learn or operate. Therefore, there is a need to provide additional ways of remotely controlling the operation of a UAV.

SUMMARY OF THE INVENTION

In accordance with an aspect of the present invention there is provided a method of remotely controlling operation of a plurality of unmanned aerial vehicles, performed by a computing device, the method comprising: receiving real-time vehicle status data from a plurality of unmanned aerial vehicles ("UAVs"), the vehicle status comprising vehicle location data; displaying at least a subset of the received vehicle status data for each of the plurality of UAVs in a single interface, the displaying comprising providing a graphical representation of the respective vehicle location data of each of the plurality of UAVs; receiving a control command input associated with one of the plurality of UAVs having vehicle status data displayed in the single interface, the control command input received through the single interface; and transmitting the received control command to the respective one of the plurality of UAVs.

In accordance with another aspect of the present invention, there is provided a non-transitory computer program product tangibly embodying code that, when executed by a processor of a computing device, causes the processor to: receive real-time vehicle status data from a plurality of unmanned aerial vehicles ("UAVs"), the vehicle status comprising vehicle location data; display at least a subset of the received vehicle status data for each of the plurality of UAVs in a single interface, the displaying comprising providing a graphical representation of the respective vehicle location data of each of the plurality of UAVs; receive a control command input associated with one of the plurality of UAVs having vehicle status data displayed in the single interface, the control command input received through the single interface; and transmit the received control command to the respective one of the plurality of UAVs.

In accordance with another aspect of the present invention, there is provided a system comprising a computing device configured to: receive real-time vehicle status data from a plurality of unmanned aerial vehicles ("UAVs"), the vehicle status comprising vehicle location data; display at least a subset of the received vehicle status data for each of the plurality of UAVs in a single interface, the displaying comprising providing a graphical representation of the respective vehicle location data of each of the plurality of UAVs; receive a control command input associated with one of the plurality of UAVs having vehicle status data displayed in the single interface, the control command input received through the single interface; and transmit the received control command to the respective one of the plurality of UAVs.

In accordance with another aspect of the present invention, there is provided a method of remotely controlling operation of a plurality of unmanned aerial vehicles, performed by a computing device, the method comprising: receiving real-time vehicle status data from a plurality of unmanned aerial vehicles ("UAVs"), the vehicle status comprising vehicle flight elevation data; displaying at least a subset of the received vehicle status data for each of the plurality of UAVs in a single interface, the displaying comprising providing a graphical indication of the relative elevation of each of the plurality of UAVs based at least partly on the respective flight elevation data; receiving a control command input associated with one of the plurality of UAVs having vehicle status data displayed in the single interface, the control command input received through the single interface, the control command comprising a change of elevation of the one of the plurality of UAVs; and transmitting the received control command to the respective one of the plurality of UAVs.

In accordance with another aspect of the present invention, there is provided a method of remotely controlling operation of a plurality of unmanned aerial vehicles, performed by a computing device, the method comprising: receiving real-time vehicle status data from a plurality of unmanned aerial vehicles ("UAVs"), the vehicle status comprising vehicle location data; displaying a graphical representation of at least a subset of the received vehicle status data for each of the plurality of UAVs in a single interface; receiving a real-time video stream from at least one of the plurality of UAVs; displaying the real-time video stream received from one of the plurality of UAVs in the single interface based at least partly on a received video stream selection input; receiving a control command input associated with one of the plurality of UAVs having vehicle status data displayed in the single interface, the control command input received through the single interface; and transmitting the received control command to the respective one of the plurality of UAVs; wherein the video stream selection is independent of the control command input.

In accordance with another aspect of the present invention, there is provided a method of remotely controlling operation of a plurality of unmanned aerial vehicles, performed by a computing device, the method comprising: receiving real-time vehicle status data from a plurality of unmanned aerial vehicles ("UAVs"), the vehicle status comprising vehicle location data; receiving real-time location data from a target communication device; displaying a graphical representation of at least a subset of the received vehicle status data for each of the plurality of UAVs in a single interface; receiving a control command input associated with one of the plurality of UAVs having vehicle status data displayed in the single interface, the control command input received through the single interface, the control command comprising instructions for maintaining a flight path that follows movement of the target communication device; and transmitting the received control command to the respective one of the plurality of UAVs.

In accordance with another aspect of the present invention, there is provided a method of remotely controlling operation of a plurality of unmanned aerial vehicles, performed by a computing device, the method comprising: receiving real-time vehicle status data from a plurality of unmanned aerial vehicles ("UAVs"), the vehicle status comprising vehicle location data; receiving real-time location data from a target communication device; displaying a graphical representation of at least a subset of the received vehicle status data for each of the plurality of UAVs in a single interface; receiving a control command input associated with a grouping of the plurality of UAVs having vehicle status data displayed in the single interface, the control command input received through the single interface, the control command comprising instructions for maintaining a flight path that follows movement of the target communication device; determining a corresponding flight control command for each UAV of the grouping based at least partly on the control command input; and for each determined corresponding flight control command, transmitting the respective determined corresponding flight control command to the respective UAV.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Figure 35:
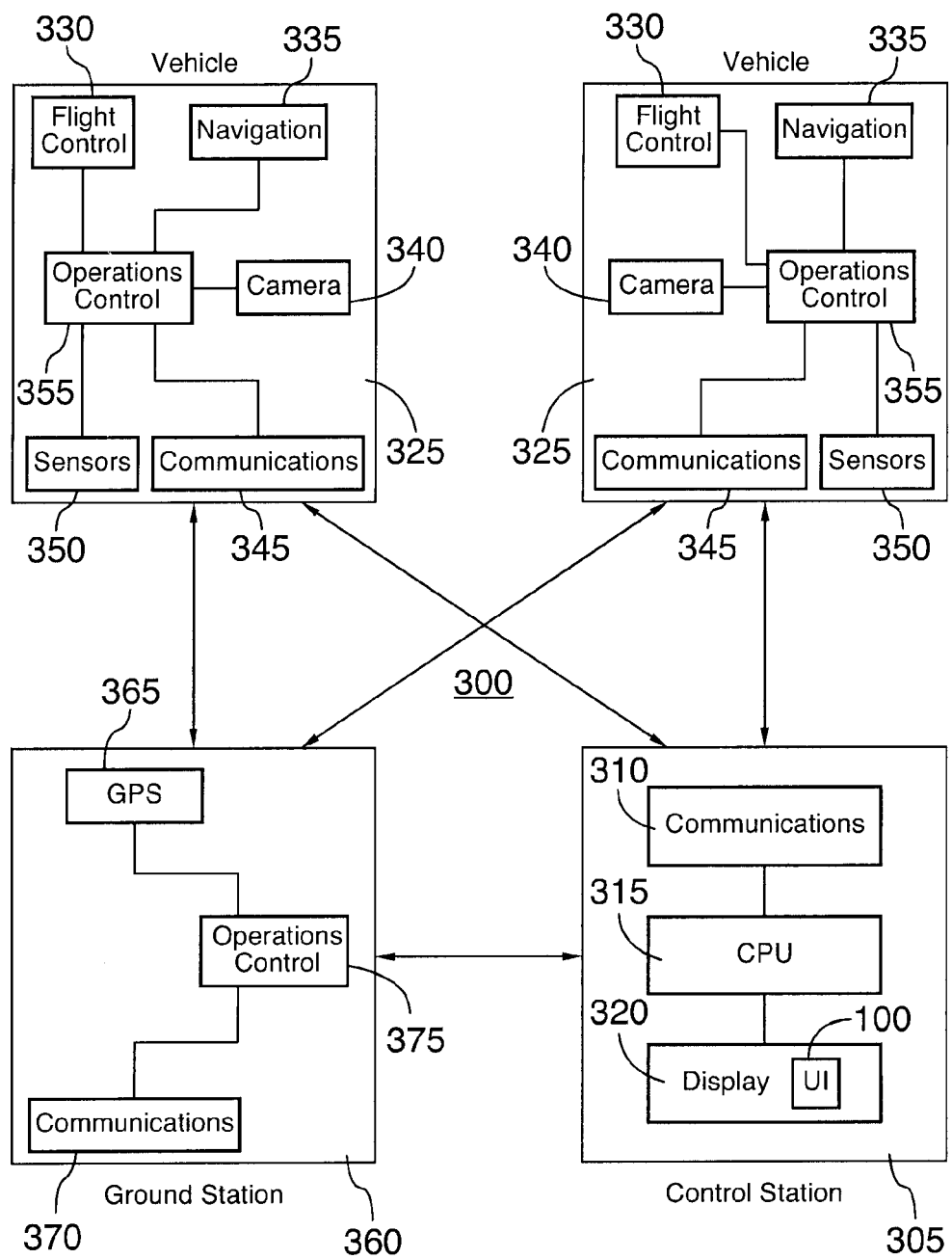
FIG. 35 illustrates a block diagram of a system in accordance with the present invention.

In various aspects, the disclosure provides a system 300 comprising a control station 305 (computing device). The system 300, as best shown in FIG. 35, optionally includes one or more ground stations 360 in communication with the control station 305. The system 300, and in particular, the control station 305 may serve to remotely control operation of one or more vehicles 325. Vehicle 325 is an unmanned aerial vehicle ("UAV") configured to transmit vehicle status data to the control station 305. The vehicle status data may be transmitted to the control station 305 in real-time, or near real-time. The vehicle status data may include vehicle location data. The control station 305 is configured to display at least a subset of the received vehicle status data for each vehicle 325 in a single interface. The displaying may include providing a graphical representation of the respective vehicle location data of each of the vehicles 325. Through the single interface, the control station 305 may receive a control command input. The control command input is associated with one of the vehicles 325 having its vehicle status data displayed in the single interface. The control station 305 may then transmit the received control command, or a command derived therefrom, to the respective vehicle 325. The single interface may provide for a user to view and control flight operation of each of the vehicles 325 such that the location of each vehicle is shown in the single interface, and each vehicle 325 may be independently controlled through the interface by selecting a particular one of the vehicles 325 to control. In this way, multiple UAVs may be monitored and controlled through a single interface.

Figure 1:
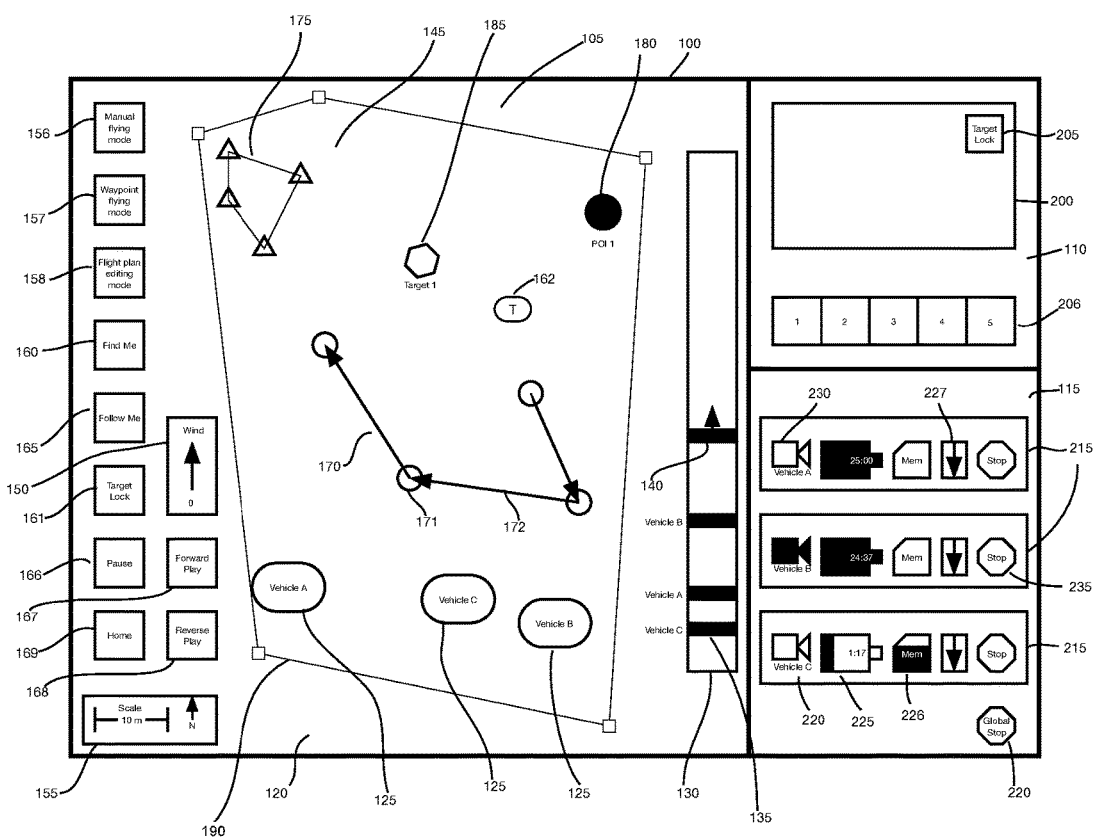
FIG. 1 illustrates a diagram of one implementation of a user interface in accordance with the present invention, showing a flight plan in a flying mode.
Figure 2:
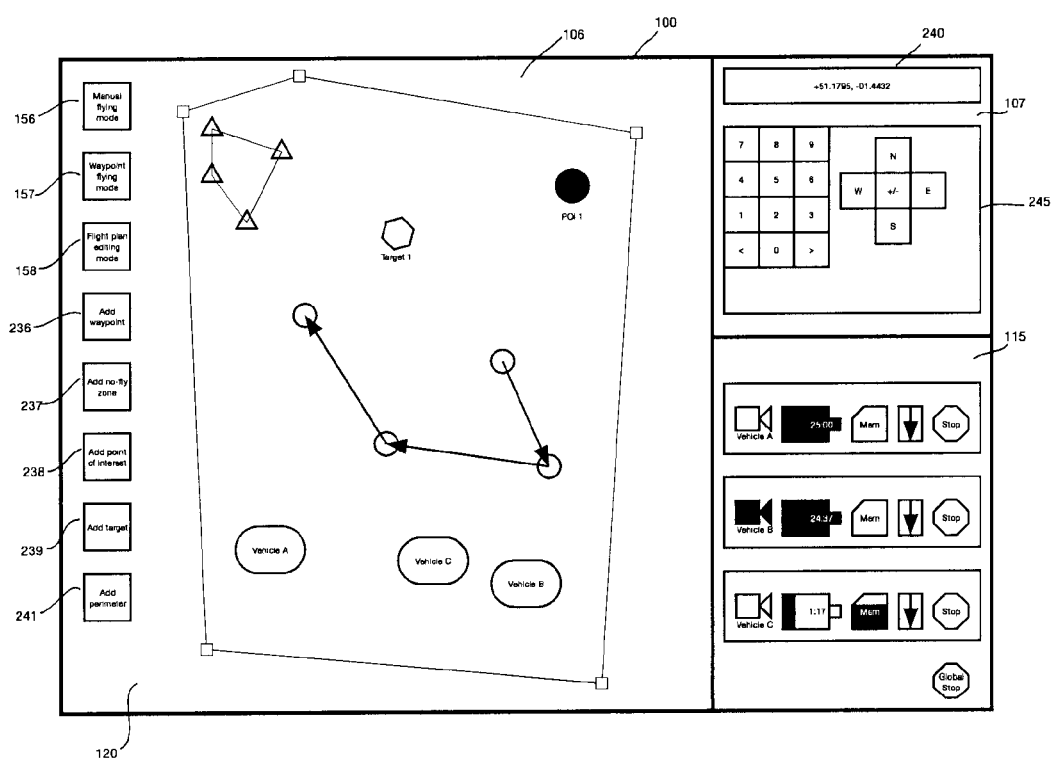
FIG. 2 illustrates a diagram of the user interface of FIG. 1, showing the flight plan editing mode.

A user interface 100 (or UI), shown in FIGS. 1 and 2, would typically appear on the display 320 of a control station 305 (shown in FIG. 35) which remotely controls the vehicles 325, or as part of a control system for one or more vehicles. The preferred implementation would be on a touch-screen display, but a more traditional non-touch display may be used instead. The preferred implementation would be on a single-unit computer (i.e. one with a built-in display), but a multi-unit computer (i.e. with a separate display) may be used instead. The control station may comprise a communications subsystem 310, a CPU or central computer system 315 and a display 320. The communications subsystem allows for wireless communications between the control station 305 and each vehicle 325, and between the control station 305 and each ground station 360, when ground stations 360 are used.

Each vehicle 325 comprises a Flight control subsystem 330, a Navigation subsystem 335, a Communications subsystem 345, an Operations controller or central computer 355, optionally a Sensor subsystem and optionally a Camera subsystem 340.

Each ground station 360 comprises a Global Positioning System (GPS) subsystem 365, a Wireless Communications subsystem 370 and an Operations controller or central computer 375.

As shown in FIGS. 1 and 2, in flying modes (manual flying mode and waypoint flying mode), the user interface ("UI") 100 may include a map view 105, a camera panel 110 and a status panel 115. The UI may also contain additional control and status icons, controls and other status information. In flight plan editing mode, the UI 100 consists of the editing map view 106, a co-ordinate entry panel 107 and a status panel 115.

The map view 105 may include an overhead map 120, icons representing the vehicles' locations 125 on the overhead map 120, icons representing the location of a ground station 126, and a ground height control 130 on which are icons representing the ground heights of the vehicles 135 and a desired height control 140. The map view may also contain zero or more of the following elements: one or more flight plan indications 145, wind speed indications 150, a scale legend 155, a Manual Flying Mode control 156, a Waypoint Flying Mode control 157, a Flight Plan Editing Mode control 158, a Find Me control 160, a Follow Me control 165, a Target Lock control 161, a Target Lock icon 162, a Pause control 166, a Forward Play control 167, a Reverse Play control 168, a Home control 169, and various other status icons and controls.

A flight plan indication 145 may include a waypoint route indication 170 (which itself is composed of one or more waypoint indications 171 and zero or more inter-waypoint vectors 172), and may additionally consist of zero or more of each of a no-fly zone 175, a point of interest 180 and a target 185. A flight plan may additionally contain one perimeter 190. Each no-fly zone 175 is comprised of one or more no-fly zone elements 176, which elements are connected by no-fly zone inter-element vectors 177.

The camera panel 110 may include a static image or streamed video images 200 from the vehicle. The camera panel may also contain a target lock indication 205, zero or more target lock presets 206, and one or more camera-related status icons or controls.

The status panel 115 may include multiple status subpanels 215, one for each vehicle currently being monitored or controlled by the UI. The status panel may also contain a global stop button 220.

Each status subpanel 215 consists of indications of the vehicle's name (or identifier) 220, the vehicle's charge/fuel level 225, a memory status icon 226, a vehicle status icon 227, and an indication of whether this vehicle is the one currently sending video or images to the camera panel 230. Each status subpanel may also contain an individual stop button 235, and one or more status icons or controls.

The editing map view 106, as shown in FIG. 2, may comprise an overhead map 120 and icons representing the vehicles' locations 125. The editing map view may also contain zero or more of the following elements: one or more flight plan indications 145, a Manual Flying Mode control 156, a Waypoint Flying Mode control 157, a Flight Plan Editing Mode control 158, a Waypoint Creation control 236, a No-Fly Zone Creation control 237, a Point Of Interest Creation control 238, a Target Creation control 239, a Perimeter Creation control 241, and various other status icons and controls.

The co-ordinate entry panel consists of a co-ordinate entry field 240, and may optionally comprise a co-ordinate entry keypad 245.

Depending on the capabilities of the system upon which it is implemented, the UI 100 may provide for user input through mouse clicks with a pointer, finger or stylus taps on a touch-screen, the use of dedicated hard or soft keys on a separate keypad, or some other method, to select icons. Since the actual hardware system of icon and functionality selection is not germane to this invention, the term "click" is used to indicate a generic icon selection action, which may be any of the actual physical actions just listed.

Many of the operations in the UI 100 depend on the concept of a vehicle "currently selected for control" (or just "currently selected"; the terms are interchangeable). The currently selected vehicle is often the only vehicle affected by certain commands or status changes; these behaviors are noted in the appropriate sections below. The method for selecting a vehicle is also noted below.

The term "ground level" is defined as the altitude of the ground at the UAV's take-off location. The term "ground height" is defined as the distance of the UAV above ground level. Normally, this information is gathered by the UAV's sensor subsystem 350 and transmitted to the control station 305 by the UAV's communications subsystem 345.

In accordance with an aspect of the present invention, the system provides multi-vehicle control with synchronization, across multiple interface panels, of an indication of which vehicle is being controlled. Each panel shows a different perspective on what is happening, but the states of the panels are synchronized, such that changing the currently selected vehicle in one panel changes the currently selected vehicle in the other panels, and each panel clearly indicates the currently selected vehicle.

The UI 100 provides a function-oriented view, with each panel representing a concept or function. In providing a single UI 100 to control and view status of a plurality of UAVs, controlling multiple UAVs at once may be simplified compared to implementations that provide completely separate UIs for each vehicle. Alternate embodiments of the present invention may change the information shown in each panel, but would still have the synchronization element present.

In accordance with an aspect of the present invention, there may be provided multi-UAV control with an indication of which UAV is being controlled synchronized across multiple interface panels. Each panel may show a different perspective on what is happening, but the respective panel states may be synchronized, such that changing the actively-controlled UAV in one panel changes the actively-controlled UAV in the other panels, and each panel clearly indicates the active UAV. By introducing additional panels a function-oriented view is provided, with each panel representing a concept or function, rather than a vehicle-based view, where each window represents a single vehicle. A single UI to control multiple UAVs is a departure from existing UAV UIs that provide completely separate UIs for each UAV. The panels may be rearranged to show different information in each panel. Each panel may provide synchronized information and controls over the active UAV.

A plurality of control display arrangements are provided that are easy to use, and easy for users to learn to use. These arrangements provide intuitive and logical access to key control functions for multi-UAV control on a relatively small screen display, and in a way that supports a number of important multi-UAV control workflows, as described in this disclosure. The control display arrangements for example provide prominent display of important control features such as multi-UAV height control in order to achieve minimum height requirements, but also to help avoid collision between the UAVs. The control display arrangements are also designed so that a user can easily switch between different panels or subpanels in a way that allows a user to process information rapidly, and react to new information rapidly, in order to meet multi-UAV flight objectives, as further explained below.

In one aspect, the system displays a series of control interfaces or subpanels for monitoring and controlling the flight of the plurality of UAVs, based on user selections defined by one or more multi-UAV flight control workflows. The system displays in each control interface or subpanel a display object indicating a particular one of the plurality of UAVs being controlled in that control interface or subpanel, and continues to display this display object in any subsequently displayed control interface or subpanel until a user of the computing device selects one of the plurality of UAVs other than the particular UAV. This aspect may be seen for example in FIGS. 3-32 for example, where in the bottom left corner of the control interfaces is shown a highlighted portion that represents a display object indicating the particular UAV being controlled.

In addition, to indicating the particular UAV being controlled, across the various control interfaces or subpanels, the system may also update information for the other UAVs so as to provide synchronization across the control interfaces.

In accordance with another aspect of the present invention, there may be provided a ground height indicator and control slider in order to display relative heights of the multiple UAVs simultaneously. This may allow the system and user to prevent UAV collisions and to maintain a specific minimum altitude for the UAVs. Accordingly, the height of each UAV may be controlled relative to one another. Height control commands may be provided to the UI instructing one of the UAVs to fly to an absolute height, fly to a height relative the UAV's current height, or to maintain an approximate elevation separation relative to one or more of the respective UAVs. Ground height may not be considered a similar dimension to X and Y dimensions, so an immediate at-a-glance view of the heights may allow the user to understand the situation quickly. In many situations, the user seldom needs to know details about absolute height during normal flight apart from maintaining a minimum safe altitude, but often needs a general idea of relative heights, and a general idea of height directions (i.e. rising vs. falling). When controlling a UAV to maintain an approximate elevation separation relative to another UAV, the control station may monitor the height of each respective UAV, and direct each UAV to change elevation without further user input. Alternatively, each UAV may be configured to maintain such a separation when receiving location information of the other UAV from the control station 305.

In accordance with another aspect of the present invention, there may be provided independent control of the video source irrespective of the UAV is being controlled. All of the controls are preferably linked between panels except for the video source. The user often wants to separate vehicle control from video control, similar to how a multi-camera TV studio will need to control multiple cameras in real-time without changing the video source. This allows a second UAV to be repositioned while the video from the first UAV is still being streamed, and once the second UAV is in position, the video source can be switched to the second UAV. An alternative would be to have multiple windows or panels streaming video from each UAV simultaneously. This is more distracting if the user only wants video from one UAV (as much of the time, the video would not be of anything of interest), and consumes considerably more bandwidth, but is certainly an option.

In accordance with another aspect of the present invention, there may be provided a "Follow-me" mode. UAV control in other implementations is generally focused on either absolute flight plans (i.e. fixed points on a map), or flight plans that involve following a target that exists outside of the aerial system. Follow-me maintains the distance to a ground station which is part of the UAV system. This is a difference operationally since the operator has control over the ground station, and in implementation since the ground station may provide information about its own location or movements to the UAV to help the UAV track the ground station. Follow-me mode may be applicable for security applications. For example, the UAVs may be instructed to follow a convoy where the ground station is on-board the convoy or walking around with a backpack ground station for crowd control. With both of these applications, no further control is required once the UAV is in place and following the ground station.

In accordance with another aspect of the present invention, there may be provided a "Flock" mode. Instead of relying on communication between the UAVs, perhaps relying on a type of "swarm algorithm", Flock mode provides control of multiple UAVs individually from the single ground station. This may simplify implementation resulting in a more deterministic operation. In the case of multiple UAVs following a convoy, it is not necessary to reposition UAVs or reorient their cameras as the multi-UAV UI can have each UAV watching a different angle, and switch between their camera views as needed. Other implementations might send video simultaneously from each UAV.

Flight Planning

Conceptually, a flight plan may include one waypoint route, and may additionally include any or all of the following elements: no-fly zones; points of interest; targets; and one perimeter.

A waypoint is a user-specified position, represented on the map view with a waypoint indication. It is a navigable marker, meaning that a UAV may be directed to go to that position. There may be attributes associated with the waypoint, such as specific actions that a UAV must take upon reaching the waypoint (e.g. take photos, send back photos, deliver a payload, aim a payload, trigger a payload to sample, land, move to a specific height, pause before continuing on the waypoint route, raise an alert at the control station, or some other set of actions), a minimum or maximum altitude which the UAV must not exceed while within a specified proximity to the waypoint, a maximum velocity which the UAV must not exceed when within a specified proximity to the waypoint, or some other attribute.

A waypoint route is a series of connected, directed vectors representing the desired path of travel for the UAV from a start point to an end point, and optionally moving through any number of intermediate navigable markers (waypoints or points of interest). There may be attributes associated with each vector in the waypoint route, such as a maximum, minimum, desired or default velocity (which may be specific to the vector or may be shared across the entire waypoint route); a maximum, minimum, desired or default UAV height (which may be specific to the vector or may be shared across the entire waypoint route); a specific action for the UAV to take while travelling along the vector (e.g. take photos, send back photos, aim a payload, deliver a payload, trigger a payload to sample, raise an alert at the control station, or some other set of actions).

In an alternate embodiment, a flight plan may consist of multiple waypoint routes, with each waypoint route associated with one or more vehicles.

A no-fly zone is conceptually a shape on a map, through whose boundary a vehicle may not pass, such that a vehicle may not be located within the no-fly zone. The preferred embodiment for a no-fly zone is a closed, ordered series of points, and the lines connecting these points. An alternate embodiment would be a regular shape, such as a circle or oval, with specified defining characteristics (e.g., for a circle, center point and radius).

A point of interest ("POI") is a navigable marker (that is, a marker to which the vehicle may be navigated), unless it is located within a no-fly zone. A POI may also be used as a target for camera viewing, sensor readings, or as an objective point for another on-vehicle payload.

A target is a non-navigable marker (that is, a marker to which a vehicle may not be navigated). A target is often used to indicate an objective point for camera viewing, sensor readings, or some other on-vehicle payload. A target may be contained within a no-fly zone.

A perimeter is conceptually a shape on a map, through whose boundary a vehicle may not pass, such that a vehicle must be located within the perimeter. The preferred embodiment for a perimeter is a closed, ordered series of points, and the lines connecting these points. An alternate embodiment would be a regular shape, such as a circle or oval, with specified defining characteristics (e.g., for a circle, center point and radius). A different embodiment may relax the requirement for a vehicle to be located within the perimeter; in this case, the perimeter would be used for visual reference only.

Operation of Flight Plan Editing

Figure 11:
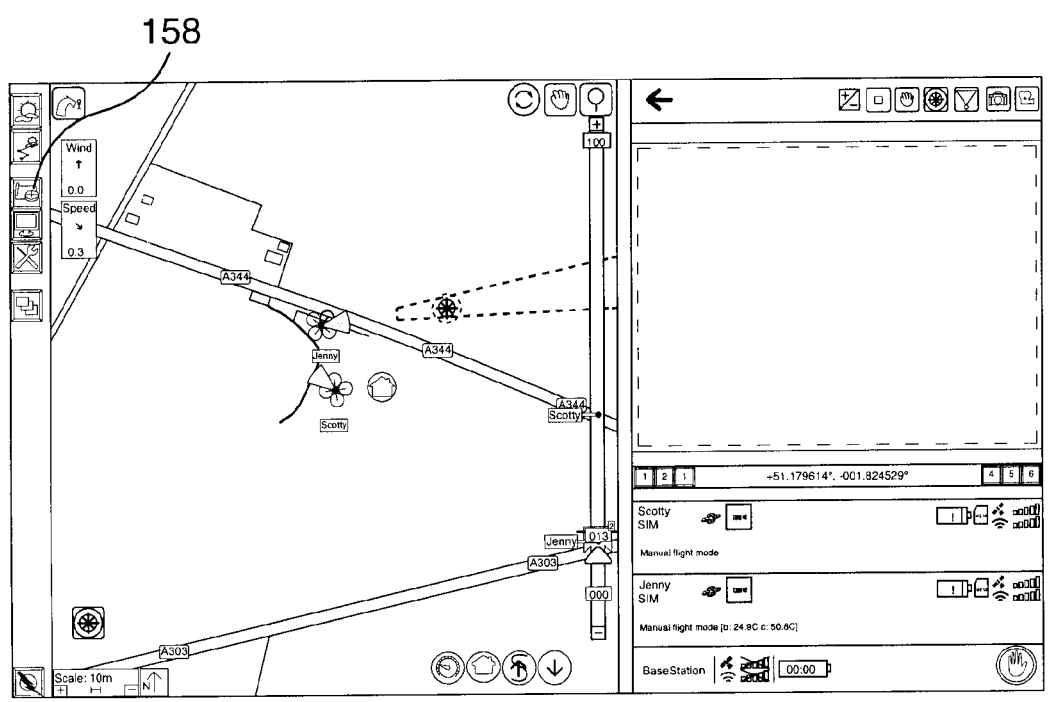
Figure 22:
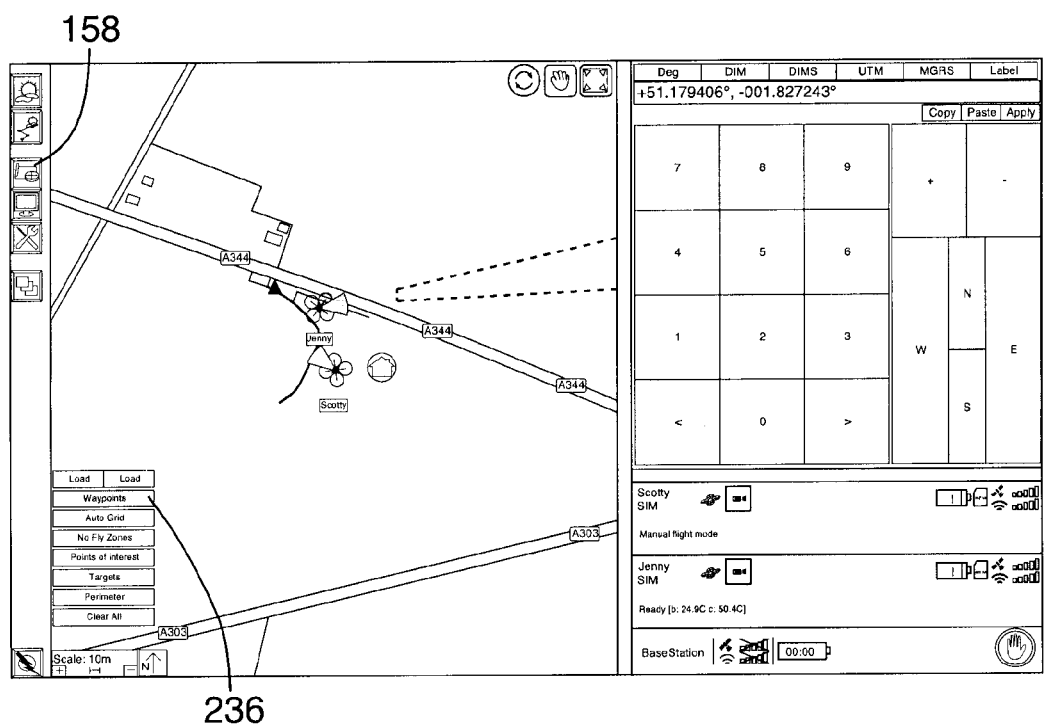

Flight plan editing mode is the mode used to create and edit flight plan elements. The user enters this mode by clicking on the Flight Plan Editing Mode control 158. Referring to FIG. 11, the Flight Plan Editing Mode control 158 is un-highlighted. The user clicking on that control causes it to highlight, and causes the system to enter Flight Plan Editing Mode; this state is shown in FIG. 22. As may be expected, allowing the editing of a Flight Plan while any UAV is following the Flight Plan would result in unpredictable behaviour. Therefore, if any UAV is moving when the user enters Flight Plan Editing Mode, the control system sends instructions to those UAVs, instructing the respective UAVs to cease any motion.

In preferred non-limiting exemplary implementation of the present invention, clicking the Waypoint Creation control 236 and clicking on the map where the desired waypoints should be created creates waypoints 171 in those locations, and additionally creates a waypoint route 170 between those waypoints. Waypoints may also be added by entering the co-ordinates of the waypoint on the co-ordinate entry panel 107. The inter-waypoint vectors 172 are automatically created to create an overall waypoint route 170. The vectors 172 point from one waypoint to the next one created. This route is automatically added to the current flight plan.

Figure 23:
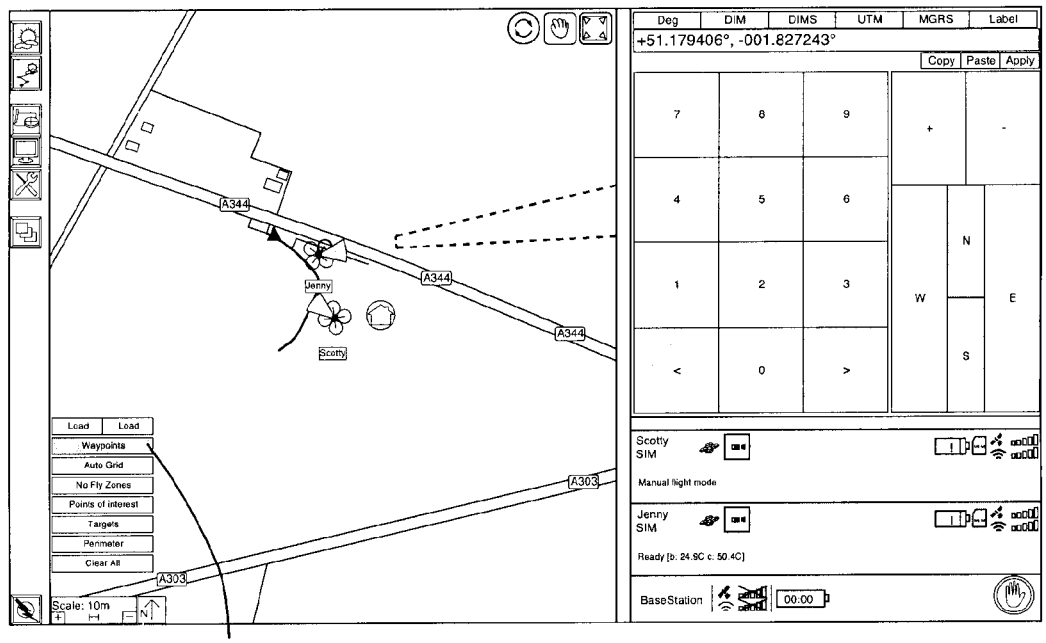
Figure 24:
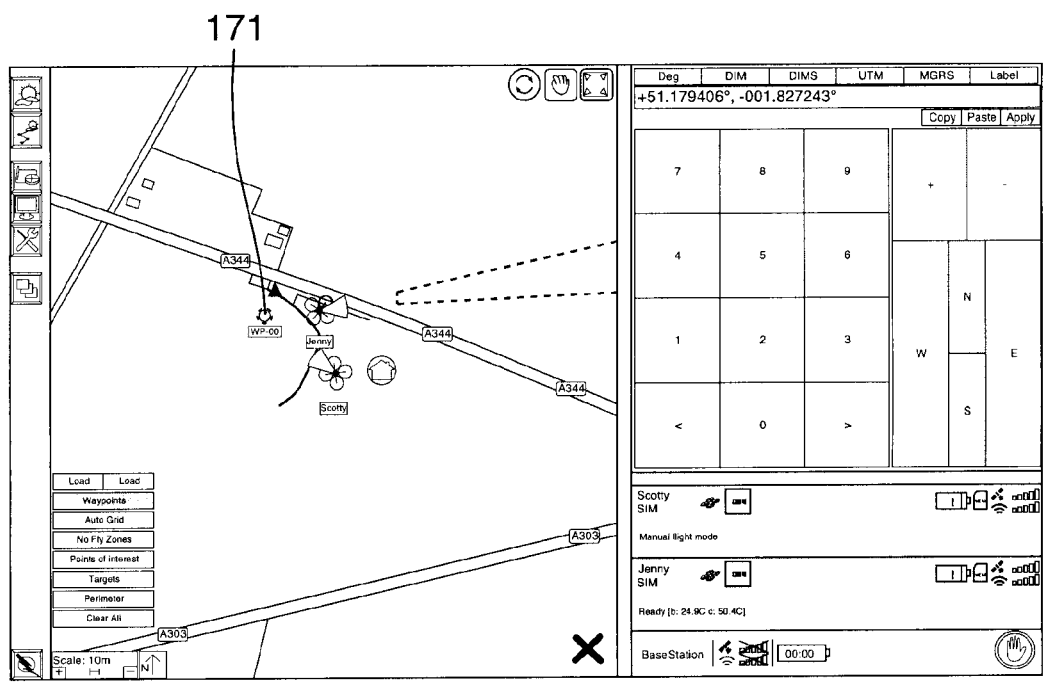

This process may be seen in the Figures. In FIG. 22, the control station is in Flight Plan Editing Mode. Clicking on the Waypoint Creation control 236 causes that control to be highlighted, and for the system to await the input of a waypoint; this state is shown in FIG. 23. Next, the user clicks on a location in the map view, which causes a Waypoint indication 171 to be placed at that location; this is shown in FIG. 24. As a subsequent waypoint location is clicked, as in FIG. 25, a new waypoint 171 is placed at each clicked location, and an inter-waypoint vector 172 is drawn from the previous waypoint to the most-recently-added waypoint.

Optionally, when a waypoint is added near to an existing segment of a waypoint route, the waypoint route creation algorithm may recognize this proximity, and rather than add the waypoint to the end of the route, may instead insert the waypoint between two other waypoints on the waypoint route.

Optionally, a waypoint route may be created by clicking the waypoint creation tool and drawing a waypoint route on the map. The waypoints may either be automatically generated based on the flight plan, or an indication to the user may be provided indicating that explicit waypoints are not being shown, or used.

A more complex embodiment may allow individual waypoint routes for vehicles. With a particular vehicle selected, as waypoints are added to the map view, they become associated only with the selected vehicle. The waypoint route is generated from these waypoints as per the methods above. The waypoints and waypoint routes for one vehicle are differentiated from the waypoints and waypoint routes for another vehicle either through icon differentiation by vehicle (e.g. blue vs. red waypoint icons, round vs. square waypoint icons) or through ghosting out or changing the icon attributes (color, shape, etc) when a particular vehicle is selected or deselected. For example, when vehicle A is selected, its waypoint icons become highlighted in some way (darker, brighter, etc), while vehicle B's icons become ghosted out. When vehicle B is selected, its icons become highlighted, while vehicle A's icons become ghosted out.

Another, more complex embodiment may allow multiple global waypoint routes. In this embodiment, as new waypoints are created, the user may draw (or otherwise specify) a waypoint route to move from one of these waypoints to another. Each vehicle may then be directed, through a UI icon or command, to begin following a specific waypoint route. The waypoints for each flight-plan may be differentiated through icon differentiation (e.g. color, icon shape). The flight-plan indications may also be differentiated through color, line width or line style (single line, double line, dashed line). Each vehicle may display, either as a tag attached to its icon or as an indication in its status subpanel, an indication of which waypoint route it is currently following.

No-Fly Zones 175 may be created by clicking the No-Fly Zone Creation control 237, and then clicking on the map where the No-Fly Zone element 176 is to be placed. As each No-Fly Zone element is placed on the map, an inter-element vector 177 is created from the previously-placed element to the most-recently-placed element. When an element is placed on top of the first No-Fly Zone element, the shape is deemed to be closed, and the area bounded by inter-element vectors is deemed to be a No-Fly Zone. This may be seen in FIG. 26.

A Perimeter 190 may be created in an analogous manner to a No-Fly Zone, using the Perimeter Creation control 241.

Figure 27:
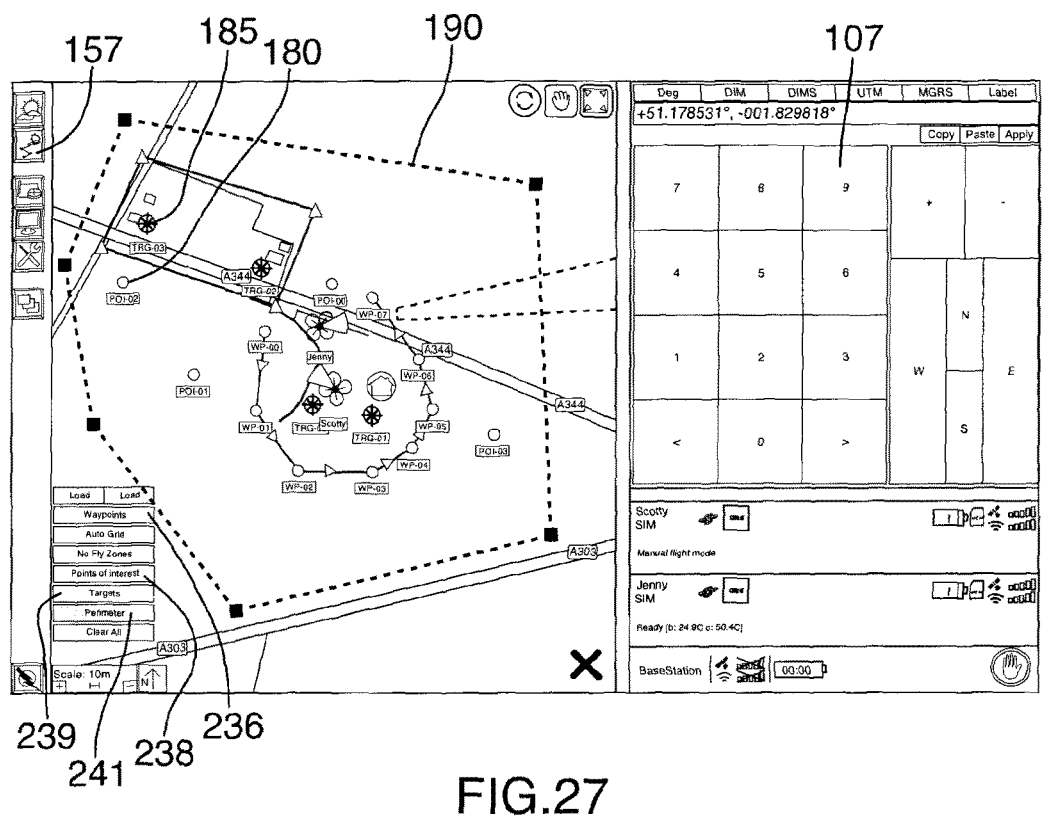

Targets 185 and Points Of Interest 180 may be added in a way analogous to the addition of waypoints, using the Target Creation control 239 or the Point Of Interest Creation control 238, respectively, in place of the Waypoint Creation control 236. When these elements are added to the map, no inter-element vectors are generated. FIGS. 1 and 27 show all of these elements.

Elements of the Map View

As a vehicle 325 moves, its respective representative icon 125 in the map view 105 shown in FIG. 1 also moves, to represent the actual position of the vehicle 325.

The wind speed indication 150, if present, is updated with information from the currently controlled vehicle. It is calculated on a per-vehicle basis, from information collected by each vehicle's sensors 350 and flight control subsystem 330, and transmitted back to the control station. In an alternate embodiment, the wind speed could be globally calculated. The ground speed indication is calculated per vehicle, and is shown for each vehicle. In alternate embodiments, the ground speed could be shown in a single place, with the value always showing the ground speed for the currently selected vehicle 325.

The Ground Height Indicator and Control

In general, the user of a system like this generally doesn't care about the absolute height of a UAV, but cares about relative heights of UAVs, to be able to prevent collision and to maintain a specific minimum altitude. As well, ground height is not considered a similar dimension to X and Y dimensions; it is measured differently, with different error ranges and error conditions, and is generally considered an adjunct to two-dimensional flight navigation. An immediate at-a-glance view of the heights allows the user to understand the altitude situation quickly. In many situations, the user seldom needs to drill down to details about absolute height during normal flight apart from maintaining a minimum safe altitude, but often needs a general idea of relative heights, and a general idea of height directions (i.e. rising vs. falling).

As shown in FIG. 1, multiple vehicles 325 may be shown on a single ground height indicator 130. The placement of each vehicle's icon 135 on the indicator shows the ground height of that vehicle. In the preferred implementation, the desired ground height control may be integrated with the individual vehicles' ground height indicator icons, so that clicking and dragging the icon moves a ghosted version of the icon 140 to the desired height. There may be multiple desired ground height controls, one for each vehicle 325, or a global desired ground height control may be raised or lowered to direct a vehicle 325 to rise or lower to the desired ground height.

Figure 3:
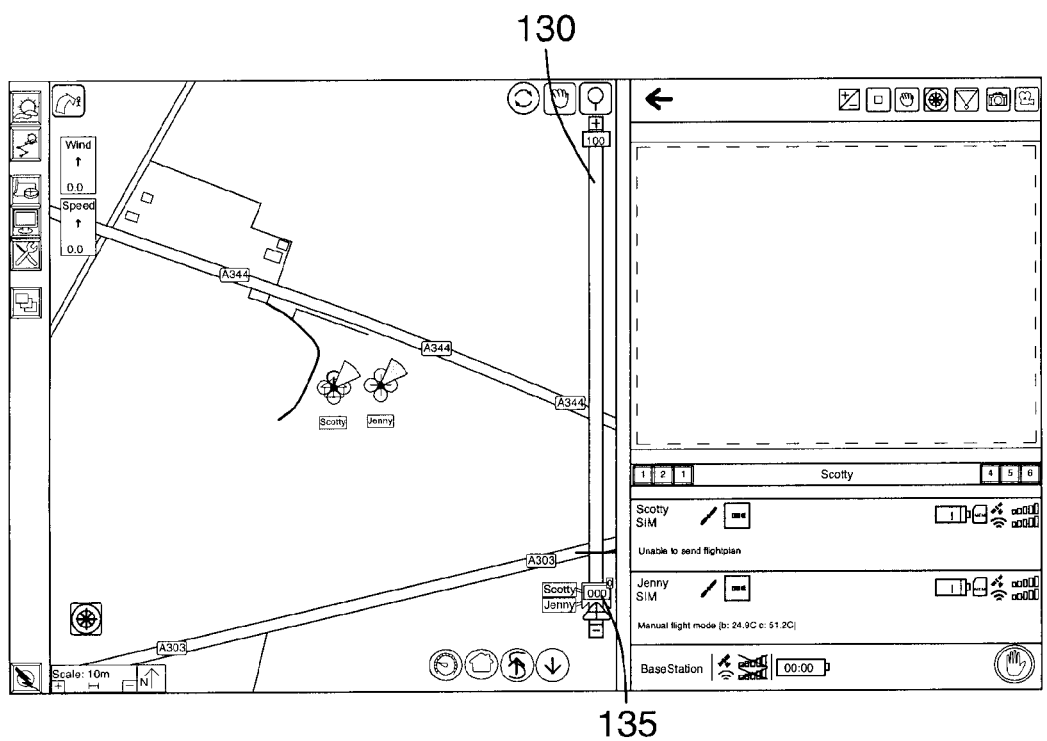
FIGS. 3-34 illustrate implementations of a user interface in accordance with aspects of the present invention.
Figure 4:
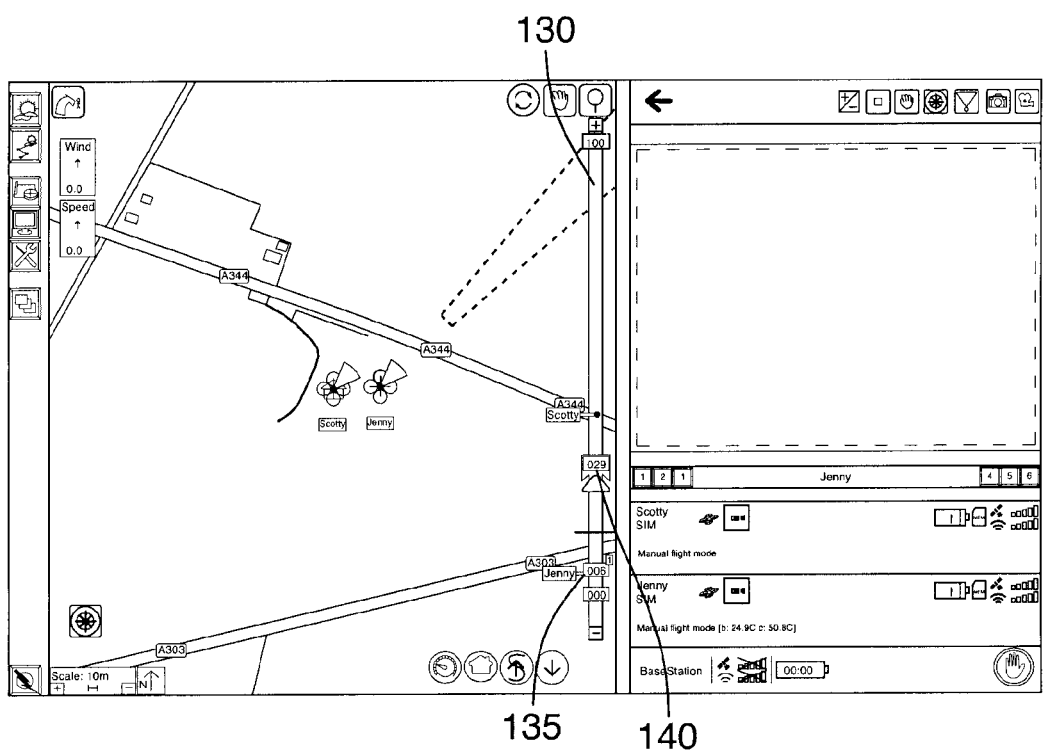

A non-limiting exemplary implementation of the ground height indicator and control slider 130 may be seen in FIGS. 3 and 4. In FIG. 3, the ground height indicator 130 shows UAVs "Scotty" and "Jenny" both at a ground height of 0, with no desired change in their height. In FIG. 4, the user has clicked on UAV Jenny's ground height indicator icon 135 and dragged it up by clicking without releasing, then pulling the indicator icon 135 up along the ground height slider 130. This action creates a ground height control 140, which indicates the desired height for that UAV which in this case is 29 meters. The ground height indicator 135 continues to indicate the current height for the UAV which in this case is 6 meters.

Optionally, the ground height indicator 135 for each vehicle 325 may be integrated into the map view icon 125 for that UAV. Essentially, the icon 125 may contain a representation of the ground height. In this embodiment, the drag mechanism for controlling the desired height for the UAV (described above) may still be maintained, or a different method of controlling the UAV's height may be used.

Optionally, the map view may show an indication of maximum flying range. This indication may be a user-defined perimeter, a programmatically determined maximum range (calculated from estimated wireless communications range from the control station, or from measured battery levels and an estimate of power consumption levels), or a combination of the two.

Find Me Mode

Figure 30:
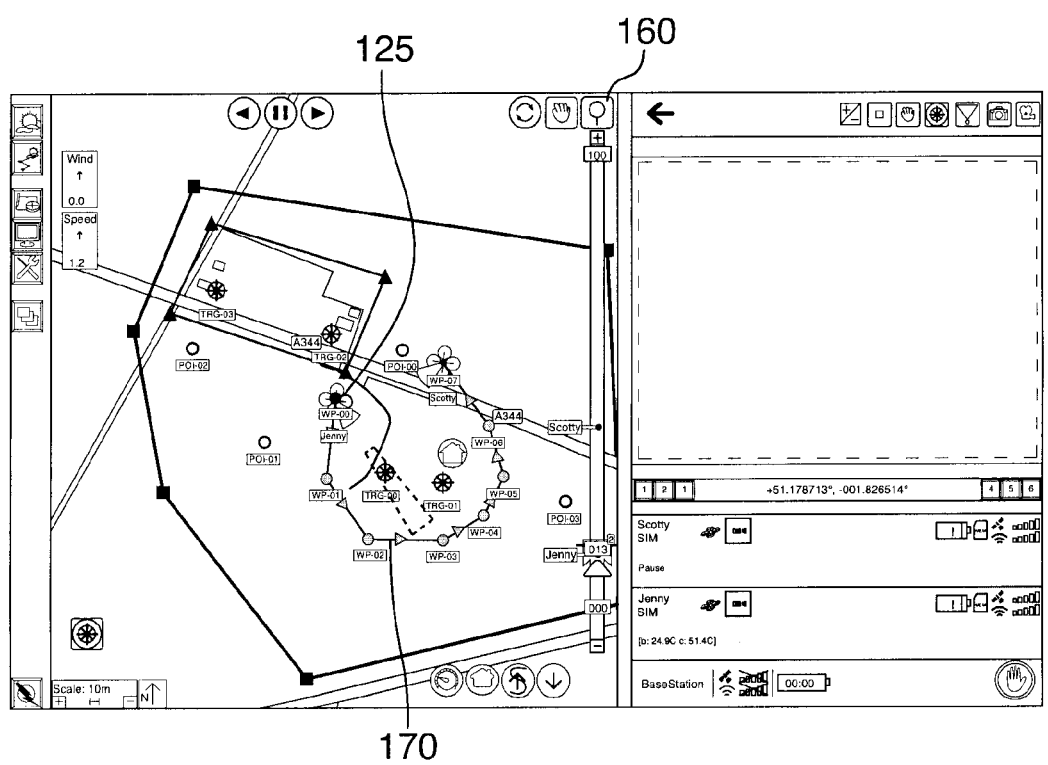
Figure 31:
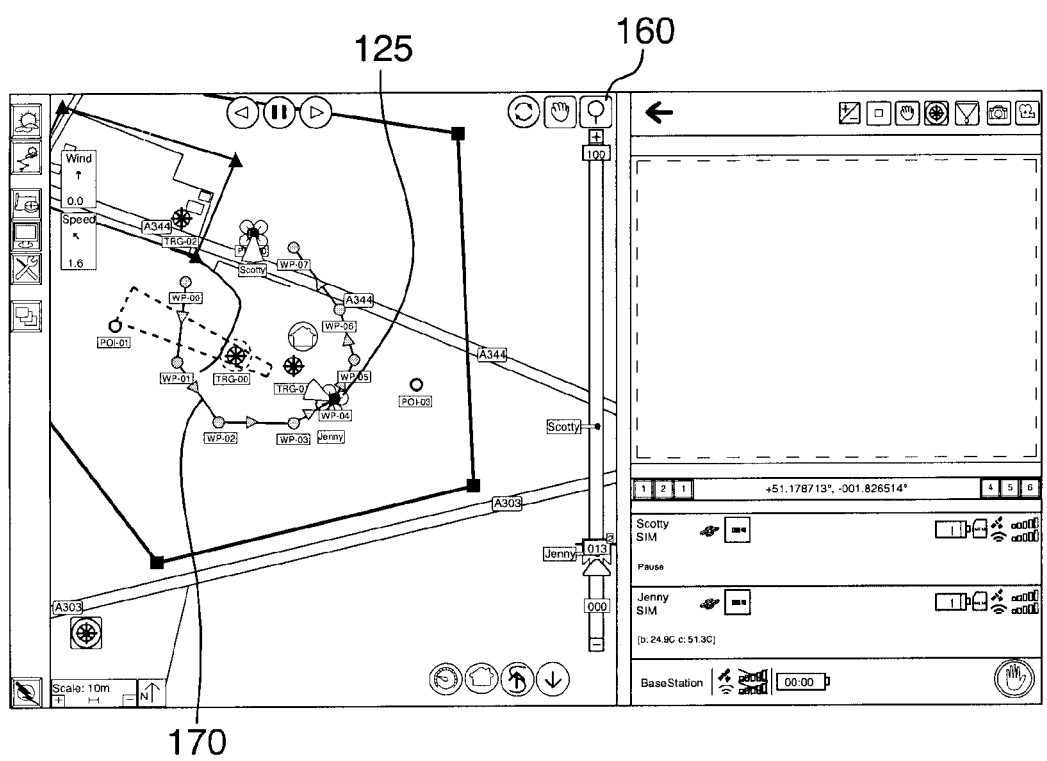

Clicking on the "Find Me" icon 160 causes the control station to shift the map of the map view so that the currently selected vehicle is centered in the view, and causes the "Find Me" icon to become highlighted. When this mode is selected, the currently selected vehicle is always centred in the view, and as the currently selected vehicle moves, the control station scrolls the map view in order to keep the currently selected vehicle in the centre. In FIGS. 30 and 31, the map view is scrolled as UAV Jenny 125, the currently selected vehicle, follows the waypoint route.

Follow Me Mode

Implementations of the present invention may provide for a follow-me mode that maintains a distance from a vehicle 325 to a ground station 360 which is part of the UAV system. This differs from other implementations where an absolute flight plan is defined in reference to fixed points on a map, or flight plans that involve following a target that exists outside of the aerial system. This is a key difference operationally (the operator has control over the ground station) and in implementation (the ground station may provide information about its own location or movements to the UAV to help the UAV track the ground station). This mode is very useful, for example, for security applications (e.g. following a convoy where the ground station is on-board the convoy or walking around with a backpack ground station for crowd control). With both of these applications, no further control is required once the UAV is in place and following the ground station 360, in order for the UAV to continue to follow the ground station 360.

In an exemplary, non-limiting implementation, clicking on the "Follow Me" control 165 may place the control for the currently selected vehicle 325 into Follow mode. Upon Follow mode being engaged, the vehicle 325 will calculate and store its current map offset (either as a polar distance/direction offset or as a Cartesian x/y offset) from a ground station 360 or the control station 305. Then, as long as Follow mode remains active, whenever the calculated offset changes, the vehicle 325 may calculate and move to a new position, such that this new position brings the offset back to the originally stored offset. In other words, the vehicle may move to keep the offset constant, by constantly, frequently, or periodically re-calculating the offset and moving in order to maintain the offset at a defined value or range. This may be accomplished by the ground station 360 implementing the following algorithm: (i) instruct the ground station to report its own position to the control station; (ii) instruct the vehicle to report its own position to the control station; (iii) calculate the offset between the two positions; (iv) monitor the ground station's position for any changes; and (v) instruct the vehicle 325 to move in such a way so as to bring the current positional offset back to the offset calculated in step (iii). The offset coordination calculation may be calculated by the control station 305, ground station 360, or vehicle 325. Where either the control station 305 or ground station 360 calculates the offset coordination calculation, the control station 305 or ground station 360 may constantly or periodically transmit updated offset information to the vehicle 325.

Figure 33:
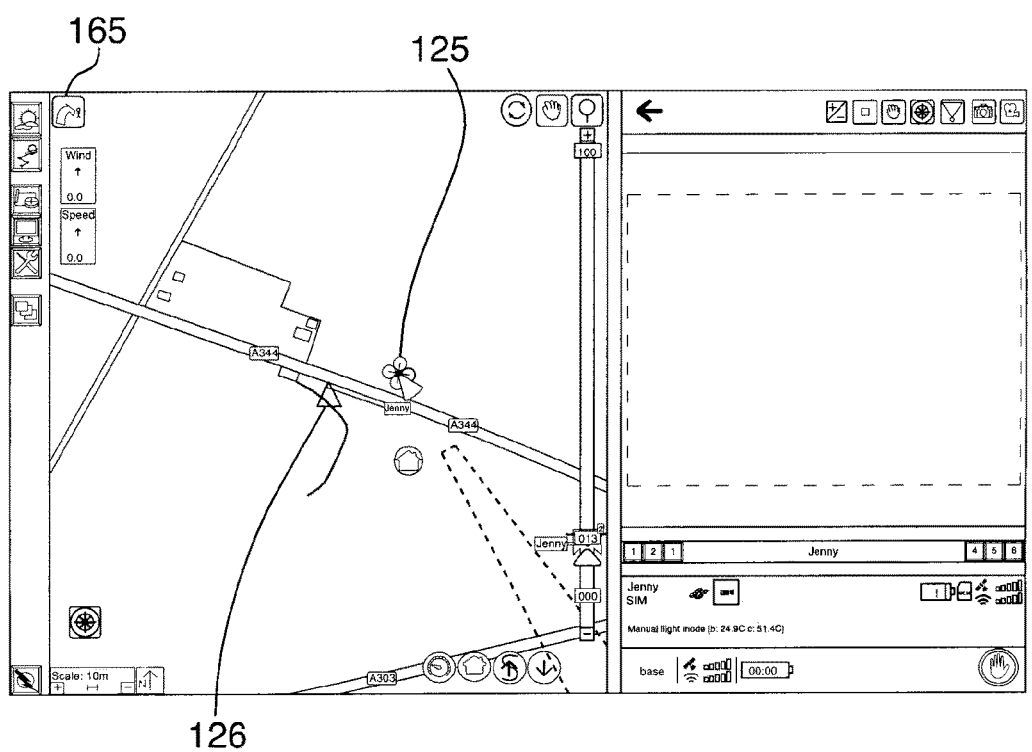
Figure 34:
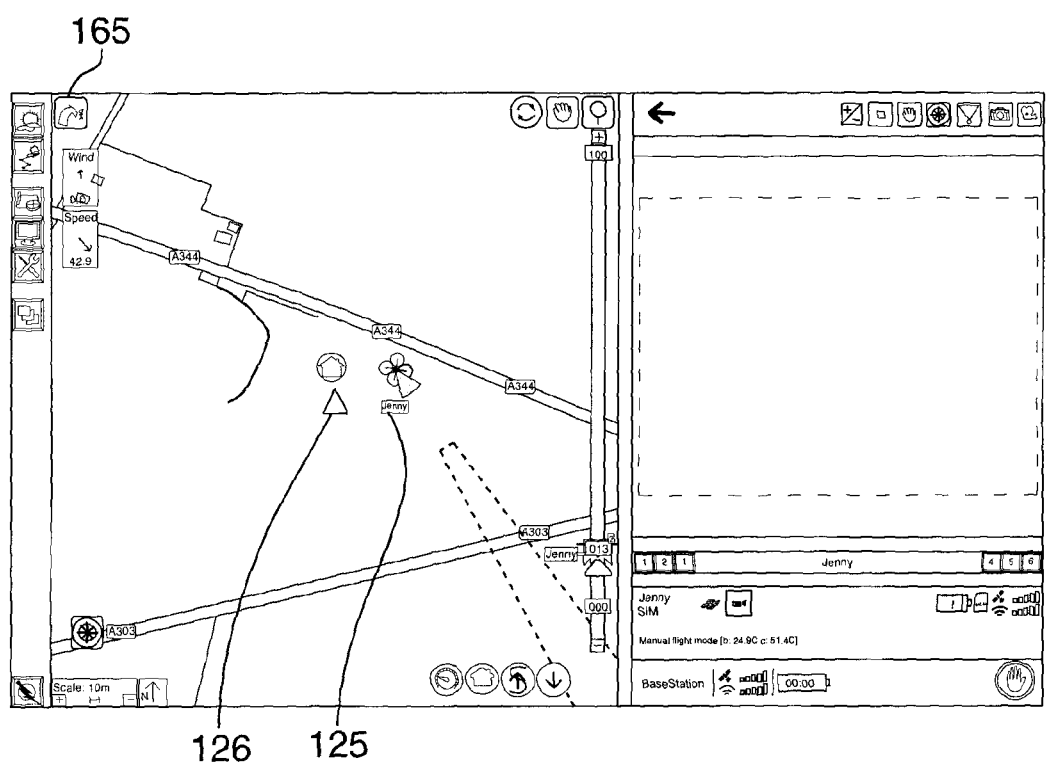

In FIG. 33, Follow Me mode has been activated by clicking on the Follow Me control 165, and UAV Jenny 125's offset from the ground station 126 has been stored. As the ground station 126 is moved to a new position, the control station instructs UAV Jenny 125 to move along with the ground station 126; this is shown in FIG. 34.

Flock Mode

As opposed to relying on direct communication between the UAVs (possibly through a type of "swarm" algorithm") providing a specific multi-UAV follow mode that controls multiple UAVs individually from the single control station of the present invention may simplify controlling multiple UAVs and may result in operation that is more deterministic than otherwise. Such a mode may be used for multiple UAVs following a convoy. For example, the user would not need to reposition UAVs or reorient the cameras of respective UAVS as the multi-UAV UI may provide for controls to direct each UAV to watch a different angle of the convoy or in relation to the convoy, and the user may switch between the respective camera views as needed.

Follow mode may be configured to only operate on the currently selected vehicle. Alternatively, at least two Follow modes may exist: a regular single-vehicle Follow mode as just detailed; and a Flock mode, which causes multiple vehicles to all individually calculate and store their offsets, and move as though they were all individually in Follow mode. The user may activate Flock mode by selecting multiple vehicles and then activating Follow mode, or by double-clicking the Follow mode icon (which then places all vehicles into Flock mode), or by holding down the Follow mode icon until a predetermined delay elapses (which then places all vehicles into Flock mode), or by selecting a separate Flock mode icon.

Waypoint Flight Mode

Waypoint flight mode is the user control mode used for automated control of vehicles. It is different from flight plan edit mode (described above) in that flight plan element editing is not permitted, and the purpose of the mode is control of vehicles rather than editing of flight plans; it is different from manual flight mode (described below) in that all of the flight plan elements created in flight plan edit mode are available for navigation, whereas manual flight mode does not consider flight plan elements and requires direct user input for navigation.

Waypoint flight mode may be entered by clicking the Waypoint Flight Mode control 157 in either the map view or the editing map view, shown in FIG. 1. Waypoint flight mode may be entered from Manual flying mode or from Flight Plan Editing Mode. As with all such mode changes, clicking on the control causes the control to be highlighted, and causes any other highlighted mode controls to become un-highlighted. For example, when the system is in the state shown in FIG. 27, and the user clicks the Waypoint Flight Mode control 157, the system state changes to that shown in FIG. 13. User interface elements that are associated with other modes, such as the co-ordinate entry panel 107 that is used with Flight Plan Editing Mode, are removed from the UI, and are replaced with elements corresponding to Waypoint flight mode, such as the camera panel 110.

Figure 13:
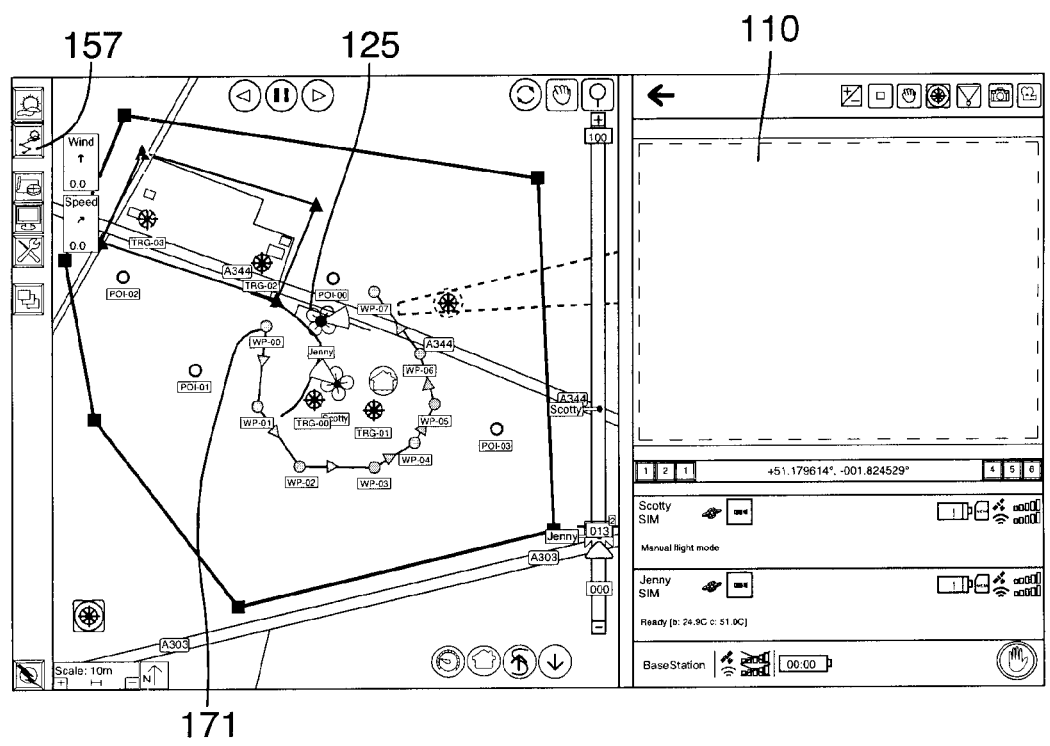

In waypoint flight mode, clicking on a waypoint or point of interest causes the currently selected vehicle to begin navigation toward that waypoint. In FIG. 13, UAV Jenny 125 is the currently selected vehicle. Clicking on the first waypoint 171 causes UAV Jenny to begin moving toward the first waypoint.

Figure 28:
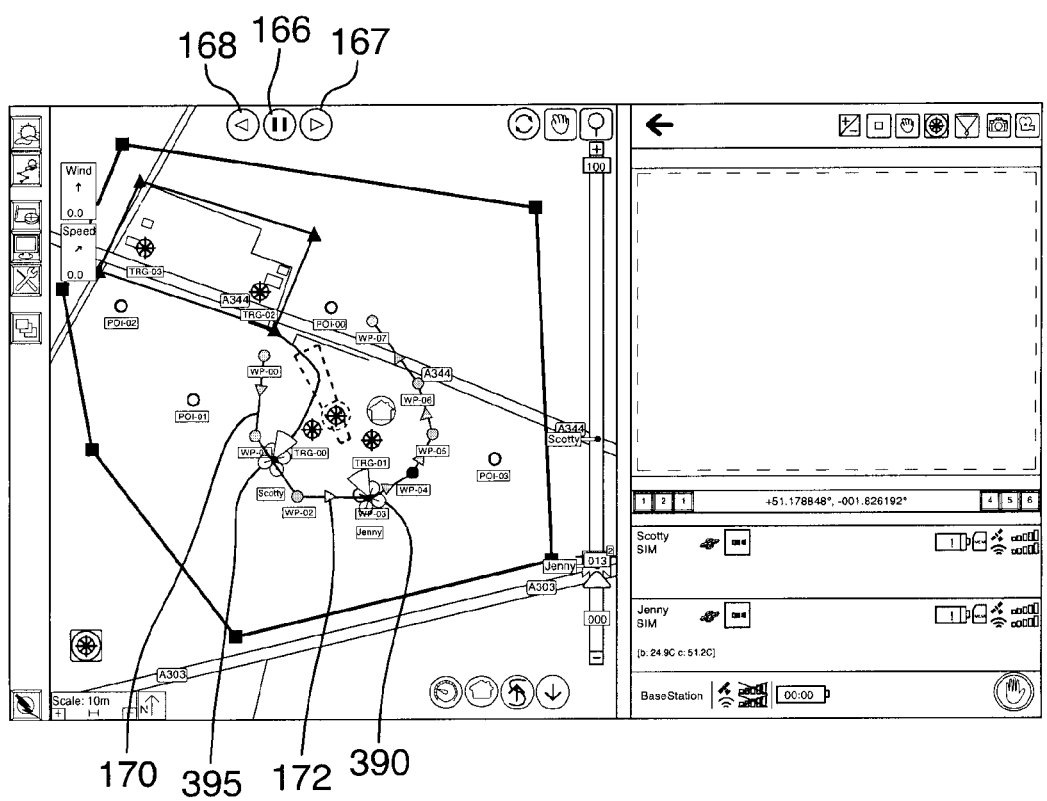

Clicking on the Pause icon 166 as shown in FIGS. 1 and 28 causes the currently selected vehicle to pause its flight movement and hover in position. Optionally, clicking on the Pause icon again may resume the previous navigation.

Figure 29:
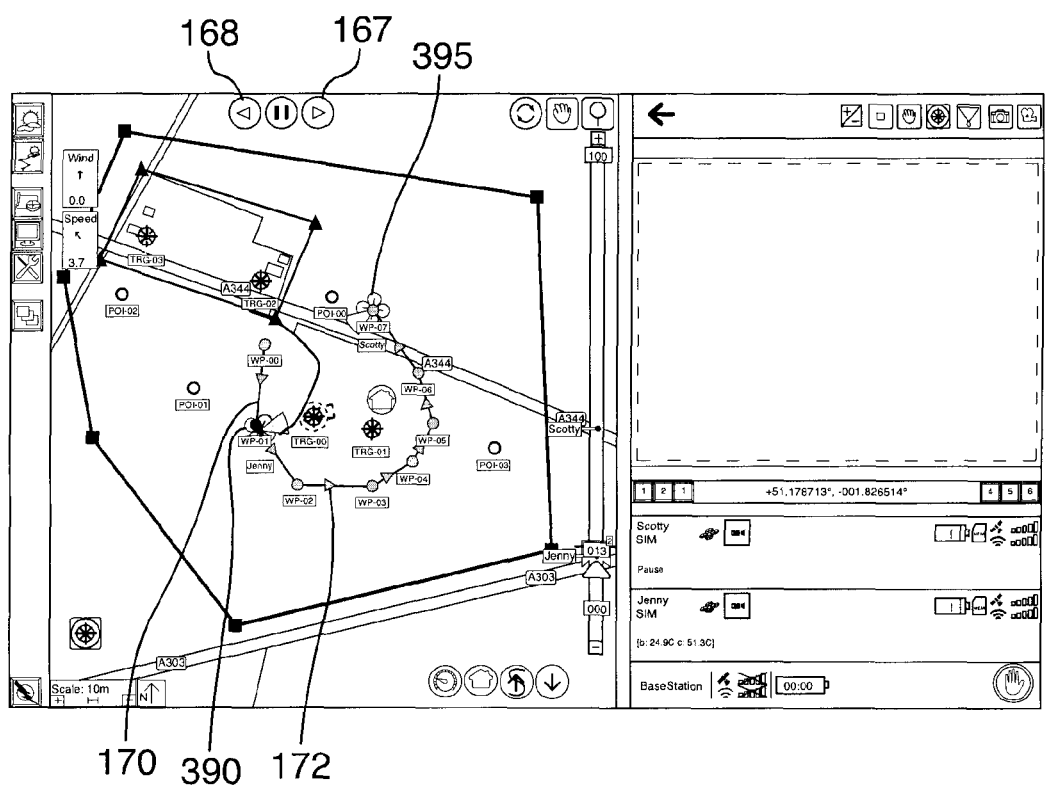

Clicking on the Forward Play icon 167 when the vehicle is positioned at a waypoint causes the vehicle to begin traversing the waypoint route, beginning with the waypoint at which the vehicle is currently positioned, in the direction in which the inter-waypoint vectors are pointing. Similarly, clicking on the Reverse Play icon 168, when the vehicle is positioned at a waypoint, causes the vehicle to begin traversing the waypoint route, beginning with the waypoint at which the vehicle is currently positioned, but in the opposite direction from Forward Play (e.g. in the opposite direction to which the inter-waypoint vectors are pointing). Referring to FIG. 28, UAV Jenny 390 is roughly half-way through the waypoint route 170, while UAV Scotty 395 is approximately one quarter of the way through the route. For each of these vehicles, the Forward Play icon 167 was clicked when each was at the beginning of the waypoint route. However, noting that UAV Jenny 390 is the currently selected vehicle, if the Reverse Play icon 168 were selected when the system is in the state shown in FIG. 28, UAV Scotty 395 would continue to move forward through the waypoint route, while UAV Jenny 390, being the currently selected vehicle, would be instructed by the control station to move through the waypoints in the reverse direction from what the inter-element vectors 172 indicate. The result is shown in FIG. 29; UAV Scotty 395 is near the end of the waypoint route (having "played" the route forward) while UAV Jenny 390 is near the beginning of the waypoint route (having been instructed part-way through the route to begin "playing" the route in reverse).

Optionally, clicking the Forward Play icon may cause the vehicle to traverse the waypoint route from any point along the waypoint route. If there is directional ambiguity at any point on the waypoint route (for instance, if the waypoint route crosses itself), and the Forward Play icon is clicked while the vehicle is positioned in that ambiguous location but not on a waypoint, the direction of traversal will be to continue to the nearest waypoint, or to continue in the direction of previous travel, as selected in a configuration setting.

Clicking on the Home icon causes the vehicle to fly directly to the home location, and once it reaches the home location, to hover. The flight home may be at the current altitude, at a specified "fly home" altitude, or at an altitude that is automatically calculated to be optimal. Essentially, the home location is treated as a waypoint for navigation. The home location is set for each individual vehicle, by default, to be the take-off location. Clicking and holding on the Home icon brings up a separate placement mode, similar to waypoint placement, which allows the setting of the home location for the currently selected vehicle. If a home location is selected which is within a specified minimum distance of another vehicle's home location, an error may be displayed requiring another home location to be chosen, or a warning message may appear allowing the home selection, or no indication may be presented. If available, this feature may be configurable at the control station 305.

Manual Flight Mode

An alternate flying mode ("manual mode," versus the "waypoint mode" in operation in the rest of this document) allows for direct user positioning of the vehicle, without creating a flight plan. The user enters manual mode by clicking the Manual Mode control 156 in either the map view or the editing map view. In this mode, when the user clicks on a location in the map view, the currently selected vehicle flies to that location; when the user releases the click, the vehicle ceases movement. If a flight plan exists, its representations on the map view stay present, but they do not affect control of the vehicle. For example, in manual mode, the user may cause the vehicle to enter a no-fly zone. In an alternate embodiment, in manual mode, if the user's input would cause the vehicle to breach the boundary of a no-fly zone or of the perimeter, the UI may display a warning, or may prevent the vehicle from acting on the input.

Optionally, manual flight mode, waypoint mode and flight plan editing mode may be combined into a single operational mode which allows all of the functionality of each mode, without switching modes.

Figure 8:
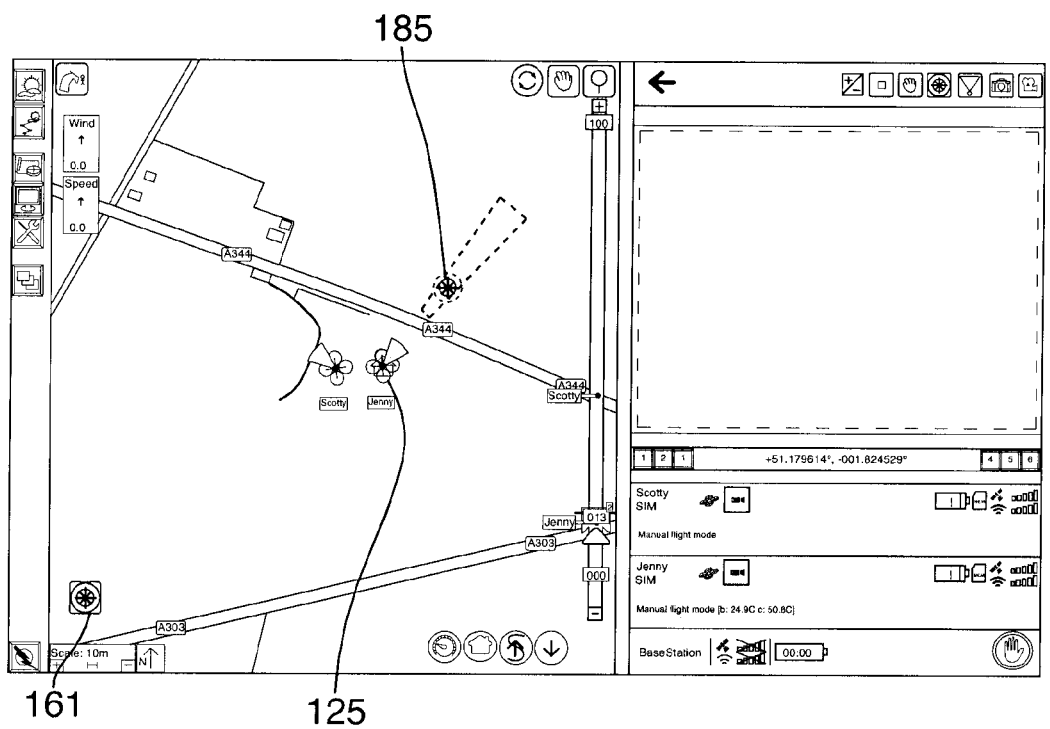
Figure 10:
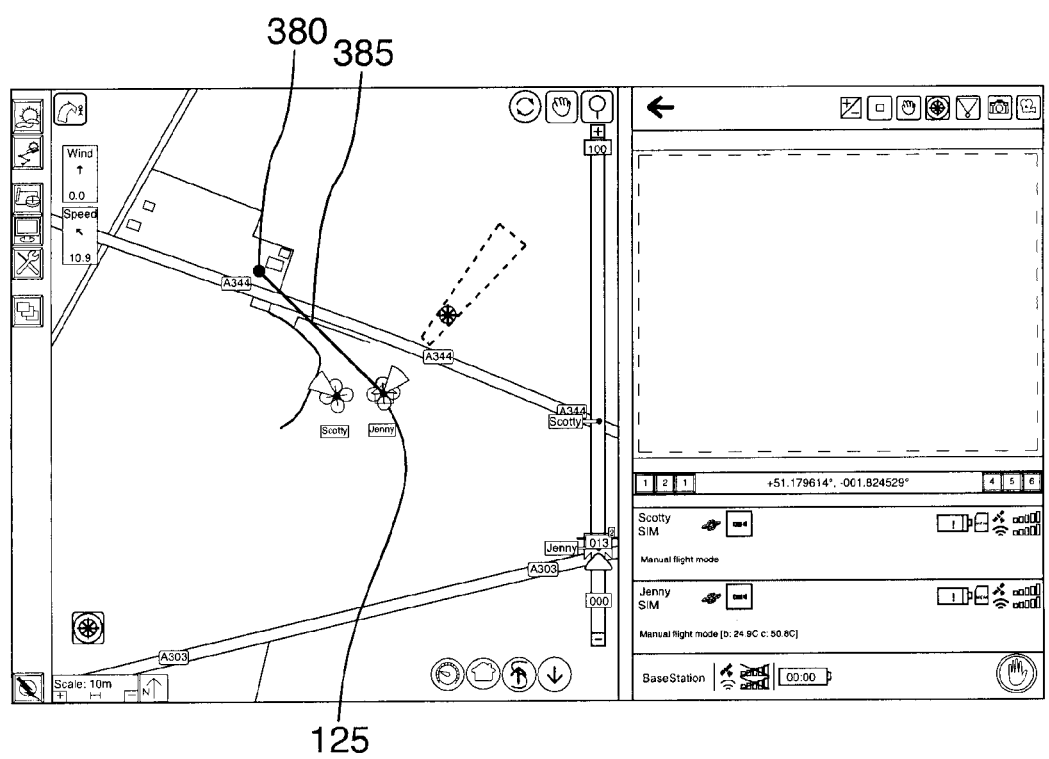

The operation of manual mode may be seen in the Figures. In FIG. 8, UAV Jenny's vehicle icon 125 is shown to be stationary. When the user clicks on a location in the map view, as shown in FIG. 10, a destination 380 and a trajectory 385 are drawn in the map view, and the control station sends an instruction to UAV Jenny to begin moving along the trajectory shown. When the user releases the click, the destination 380 and trajectory 385 are removed from the map view, and the control station sends an instruction to UAV Jenny 125 to cease motion.

Figure 32:
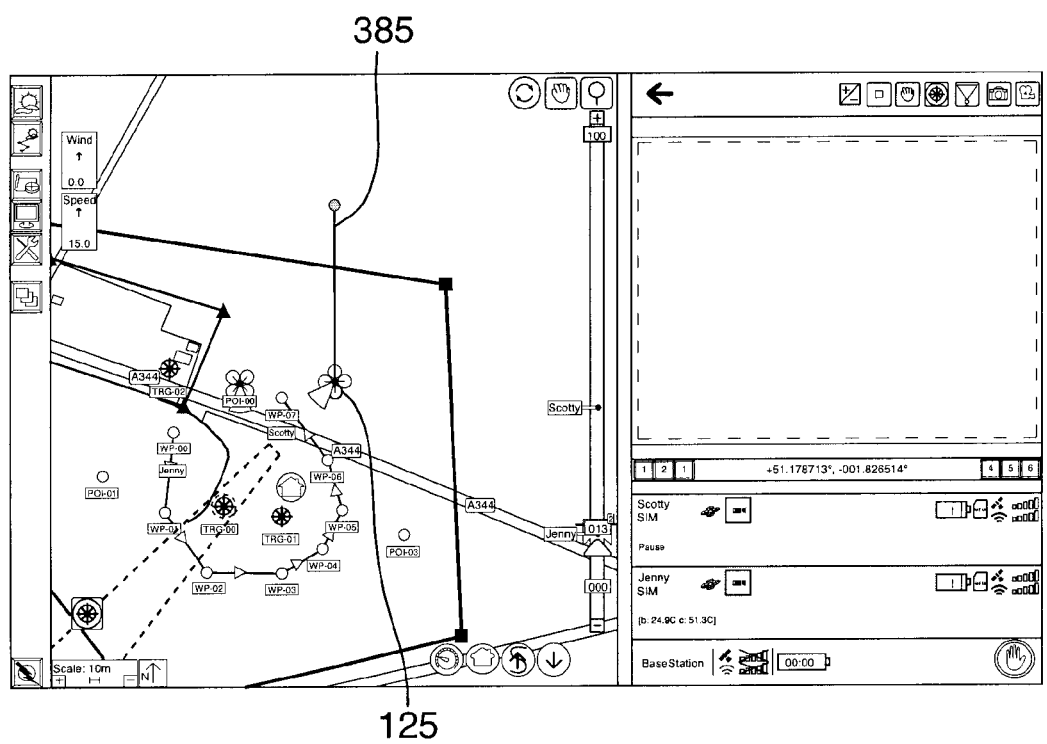

When Find Me mode is activated, Manual flight mode may function slightly differently because the control station 305 is may be constantly scrolling the map to follow the currently selected vehicle. FIG. 32 shows manual flight mode with Find Me mode activated. Unlike in regular manual flight mode, the trajectory 385 specified by the user in the manner described above effectively provides a direction rather than a destination, and the currently selected vehicle 125 will continue to move in the direction of the trajectory 385 indefinitely, as the map scrolling will constantly move the destination.

Video Streaming and Target Locking

In a non-limiting exemplary implementation of the present invention, all of the panel states and control sources may be linked between panels except for the video source. The user may choose to separate vehicle control from video control, in order to control multiple UAV cameras in real-time without changing the video source. This may provide for a second UAV to be repositioned while the video from the first UAV is still being streamed, and once the second UAV is in position, the video source can be switched to the second UAV.

When one vehicle's camera icon 230 is selected (by clicking the camera button 230 within the status subpanel 215 for that vehicle), the vehicle's camera will be the source for the images or video 200 in the camera panel 110. The camera panel may have icons or menu options for selecting which camera is the source for images or video. Preferably, independent selection of controlled vehicle and camera source is provided. In other implementations, only the video or images from a camera of a currently selected vehicle may be shown in the camera panel.

Figure 6:
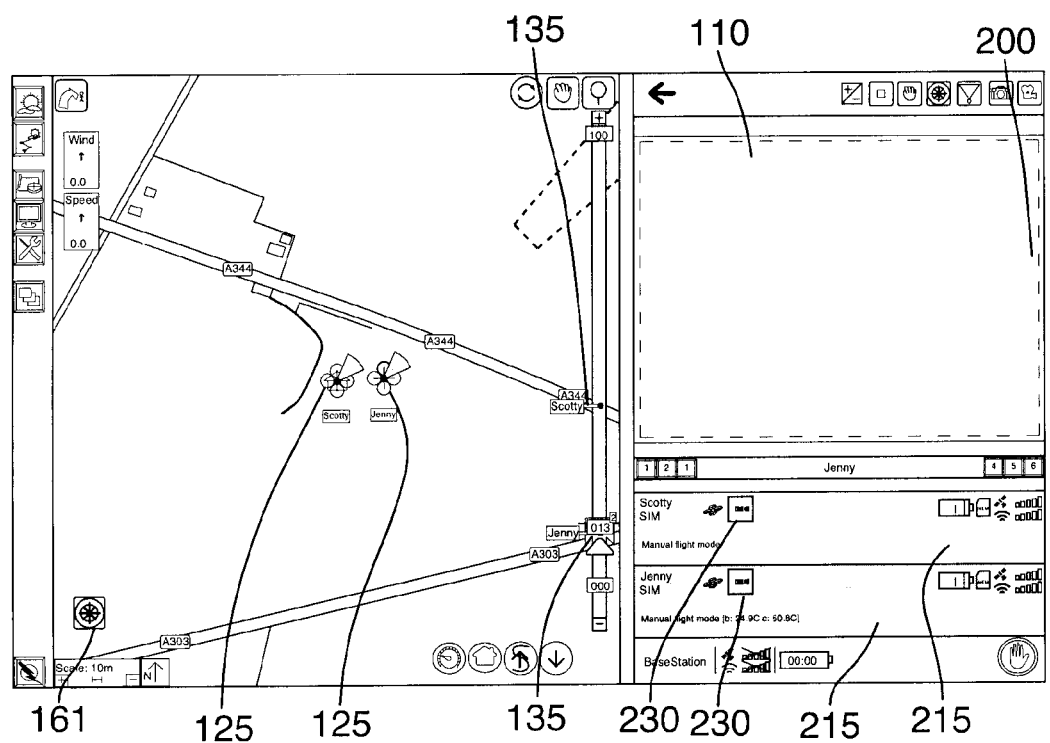
Figure 7:
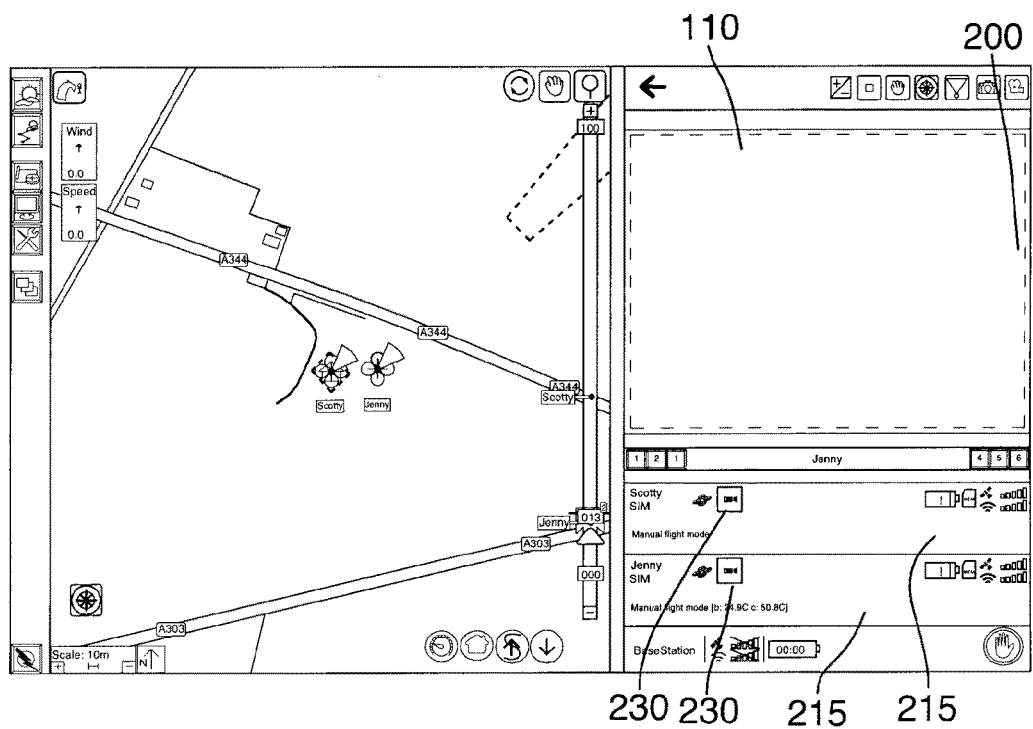

The operation of camera source selection may be seen in the Figures. In FIG. 6, UAV Jenny has already been selected for control, and is the source for video. When the user clicks on UAV Scotty's camera icon 230, the control station sends an instruction to UAV Jenny to cease transmitting video, and an instruction to UAV Scotty to begin transmitting video. UAV Jenny then ceases the transmission of video, and UAV Scotty begins transmitting video to the control station. The control station then displays this video, in real-time as it arrives from UAV Scotty, in the camera image area 200 in the camera panel 110. As well, the control station causes the camera icon 230 in UAV Jenny's Status subpanel 215 to become un-highlighted, and causes the camera icon 230 in UAV Scott's Status subpanel 215 to become highlighted, to indicate the source of the video to the user. This resulting state is shown in FIG. 7.

Alternatively, multiple windows or panels may be presented streaming video from each UAV simultaneously. However, such an implementation may be more distracting if the user only wants video from one UAV (as much of the time, the video would not be of anything of interest), and would consume considerably more bandwidth, which may be at a premium. However, in some situations it may be advantageous to be able to view video streams from multiple sources simultaneously.

Target locking can be activated in at least two ways. The first way uses the map view. In the map view, when the target lock control icon is clicked, a target lock icon may be placed at any location on the map. This specifies a target for the currently controlled vehicle, and the vehicle may take action based on that input. In the current embodiment, the target is assumed to be at ground height (with the ground height being extrapolated from the vehicle's take-off height). In an alternate embodiment, the target height may be specified by the user (relative to ground height or current vehicle height), or may be calculated from geographic data. If the vehicle whose target is being modified is not currently streaming video, target locking using the map view does not affect whatever video may currently be streamed. If the vehicle in question is currently streaming video, the video stream's camera angle may change if the target is changed.

The second method for target locking uses the camera panel. If the target lock control is clicked, the target is assumed to be in the centre of the current field of view of the controlled vehicle's camera, at ground height, and the system proceeds as though the target lock icon had been placed in the corresponding location in the map view.

When target lock is activated from either the map view or from the camera panel, the target lock icon may appear in the map view, positioned to show the location of the target. The target may be at least initially assumed to be at ground height, but it may be possible to provide an altitude indication for the target as well. Preferably, the target lock icon remains on the map view even as other vehicles are selected. Alternatively, where targets are associated with specific vehicles, a target lock icon for a given vehicle may disappear, or may be ghosted out or have its color changed, when other vehicles are selected.

The camera panel's target lock preset selectors may be used to store and then recall target lock presets. When the user clicks and holds one of the selectors, after a short predetermined hold delay, the current target is assigned to that selector. When the user later clicks on that selector but does not hold for the duration of the hold delay, that target lock preset's location is recalled, the current target is assigned the location and values stored in that preset, and the system follows the same process as though that target had just been created in the map view.

Preferably, the target lock presets are assigned per vehicle, and when a different vehicle is selected, the presets for that vehicle are made available via the selectors. Alternatively, the target lock presets are global presets, retaining their positions and values when a different vehicle is selected.

Figure 9:
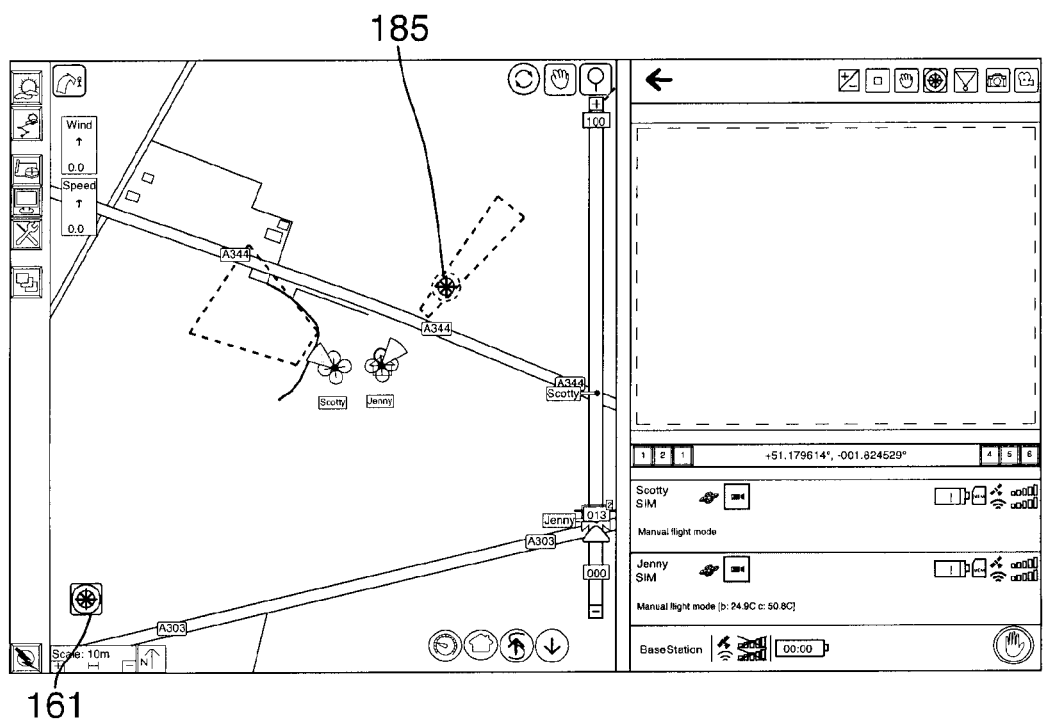

The operation of target locking may be seen in the Figures. In FIG. 6, there is no target locked, and UAV Jenny is already selected for control. The user then clicks on the Target Lock icon 161, and then clicks in the map view to place a target 185, as shown in FIG. 8. In this embodiment, the target shown is always the target for the selected UAV. FIG. 9 shows the same setup as FIG. 8, but with UAV Scotty selected as the source for the camera; the target 185 shown is still the target for UAV Jenny, because UAV Jenny is the UAV selected for control.

Status Panel and Status Subpanel Elements

Figure 5:
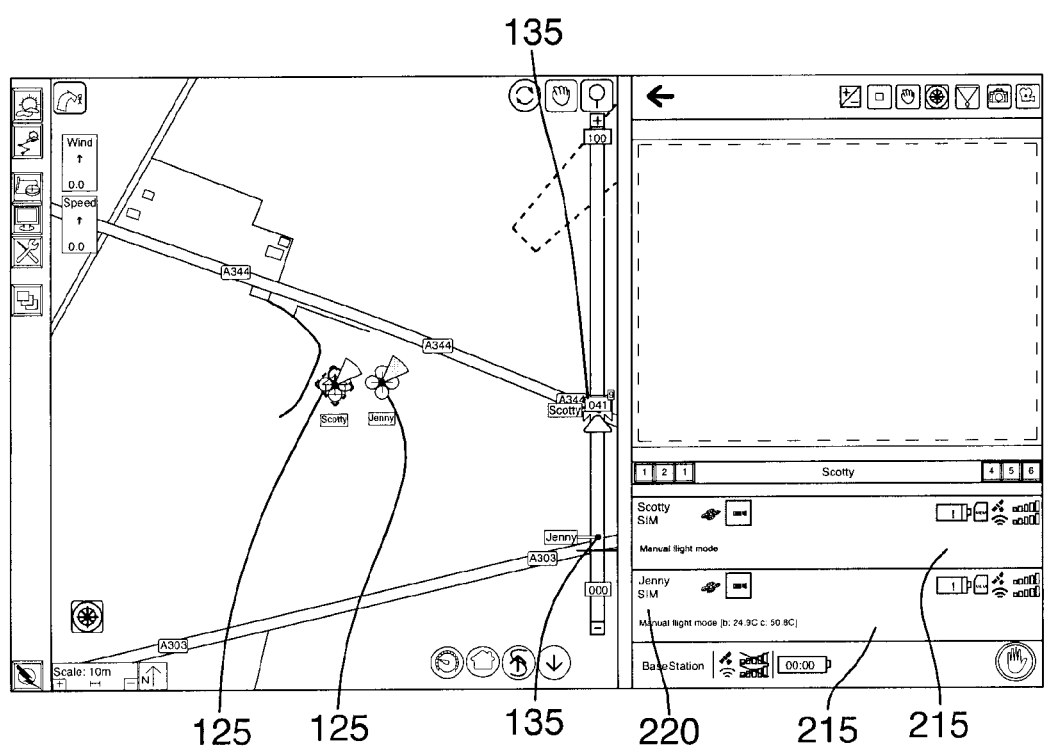

The vehicle name indicator in each status subpanel serves as the mechanism for selecting a vehicle for command. Clicking on the name causes that name to be highlighted, and causes that vehicle to be selected. Any previously-selected vehicle will be deselected, and that previously-selected vehicle's name will be un-highlighted. An alternate embodiment may use clicking on a vehicle's icon in the map view to select that vehicle for command. FIG. 5 shows UAV Scotty as having been previously selected. Clicking on UAV Jenny's vehicle name indicator 220 causes UAV Jenny to become selected for control, and for UAV Jenny's status subpanel 215 to become highlighted; this is shown in FIG. 6. As well, UAV Jenny's vehicle location icon 125 in the map view is also made highlighted, as is UAV Jenny's ground height icon 135. At the same time, UAV Scotty's status subpanel 215 is made un-highlighted, as are UAV Scotty's vehicle location icon 125 and UAV Scotty's ground height icon 135. These changes are all seen in FIG. 6.

The vehicle status icon 230 changes to indicate the state of each vehicle. In the preferred embodiment, the statuses indicated are landed (vehicle is on the ground), spinning up (vehicle is getting ready to take off), hovering (the vehicle is flying but is stationary relative to the ground), moving (the vehicle is flying and is moving relative to the ground), going home (the vehicle is flying, moving relative to the ground, and has its home base as its destination; this status superseded "moving") and landing (the vehicle is in the process of landing). Other embodiments may include indications for target following (the vehicle is flying and is following a target), vehicle following (the vehicle is flying and is following another vehicle), following flight-plan (the vehicle is flying and is following a flight-plan), in distress (the vehicle is encountering a situation considered unfavorable) or out of order (the vehicle is inoperable).

Each Status Subpanel 215 may present additional information, such as indicators for wireless modem signal strength (a measure of how strong the wireless telecommunications link to/from the vehicle is), GPS lock quality (a measure of how well the vehicle is able to triangulate its position) and error information (additional information on the last error situation encountered) shown on this panel. Alternatively, the Status Subpanel 215 may only show some of these indicators, and when the user clicks on the status icon, an Additional Information panel may open below it, with the remainder of the information displayed in this Additional Information panel. A control is also provided to close this Additional Information panel. If there is not room in the Status Panel to open this Additional Information panel, the least-recently-used Additional Information panel will close to accommodate the new panel. In an alternate embodiment, a separate window which opens on top of the UI may display this information.

Optionally, some or all of the information from the Status Subpanel may be displayed as part of the UAV's map view icon 125. For example, an indicator may be present as part of the icon 125 to show the battery level or estimated remaining flight time.

The battery charge/fuel icon 225 in the status panel indicates the estimated remaining flight time, with the flight time either estimated by the vehicle or by the control station. In alternate embodiments, it could show actual charge or fuel levels on the vehicle.

The memory status icon 226 in the Status Panel indicates the status of the amount of available computer data storage space (whether in volatile or non-volatile form) on the vehicle. Memory on the vehicle is used to store video, still images, sensor data, flight logs, and any other data that may be generated on (or relayed to) the vehicle. In the preferred embodiment, the status shows multiple levels of memory availability (e.g. "high," "medium" and "low") through one indication (e.g. color), and a more granular indication of availability through a bar graph-like indication. In an alternate embodiment, the status is a binary indication of high availability (amount of available memory is at or above a certain threshold) vs low availability (amount of available memory is below a certain threshold). The amount of memory available or used may be indicated, or an indication of how much video or flying time there is room for in the vehicle's memory may be provided.

Figure 18:
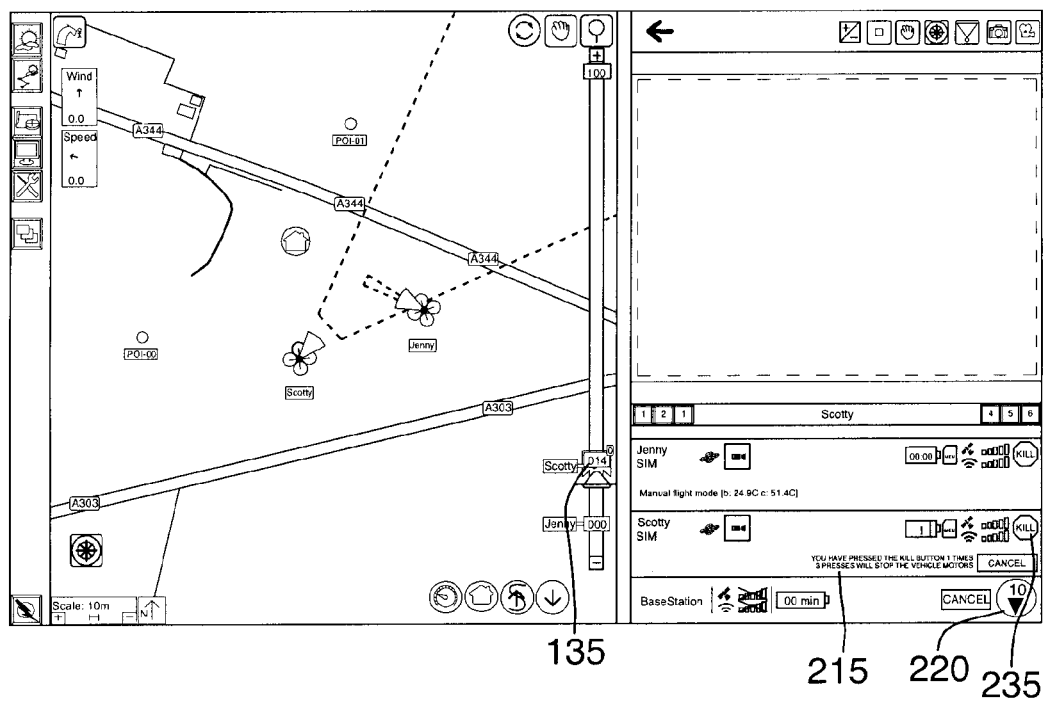
Figure 19:
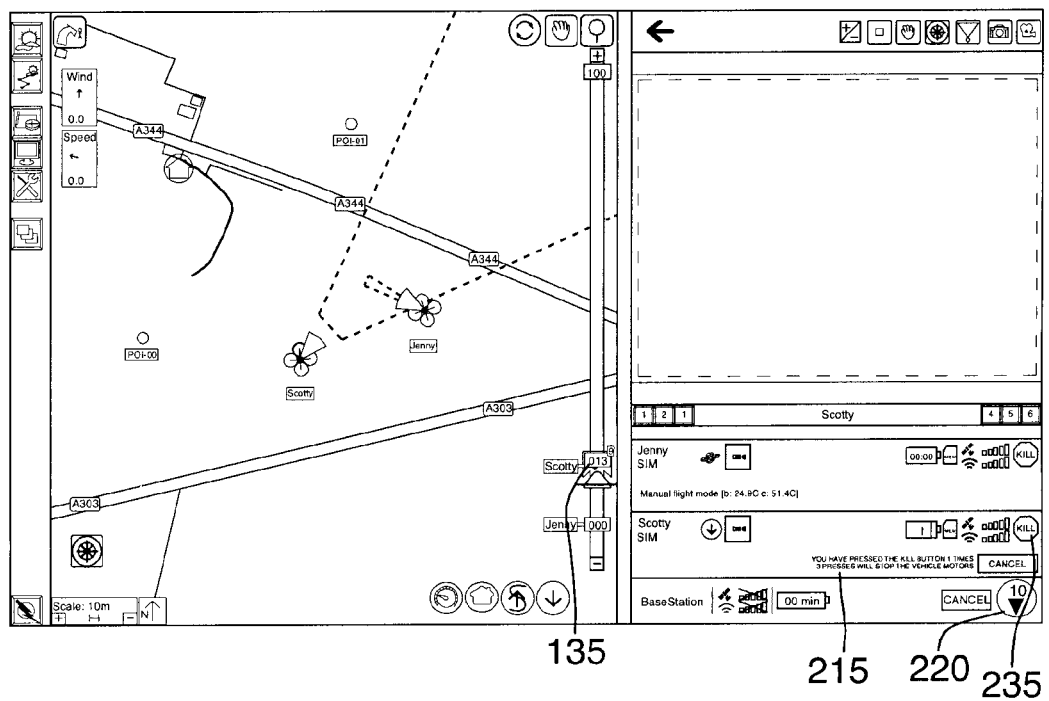
Figure 20:
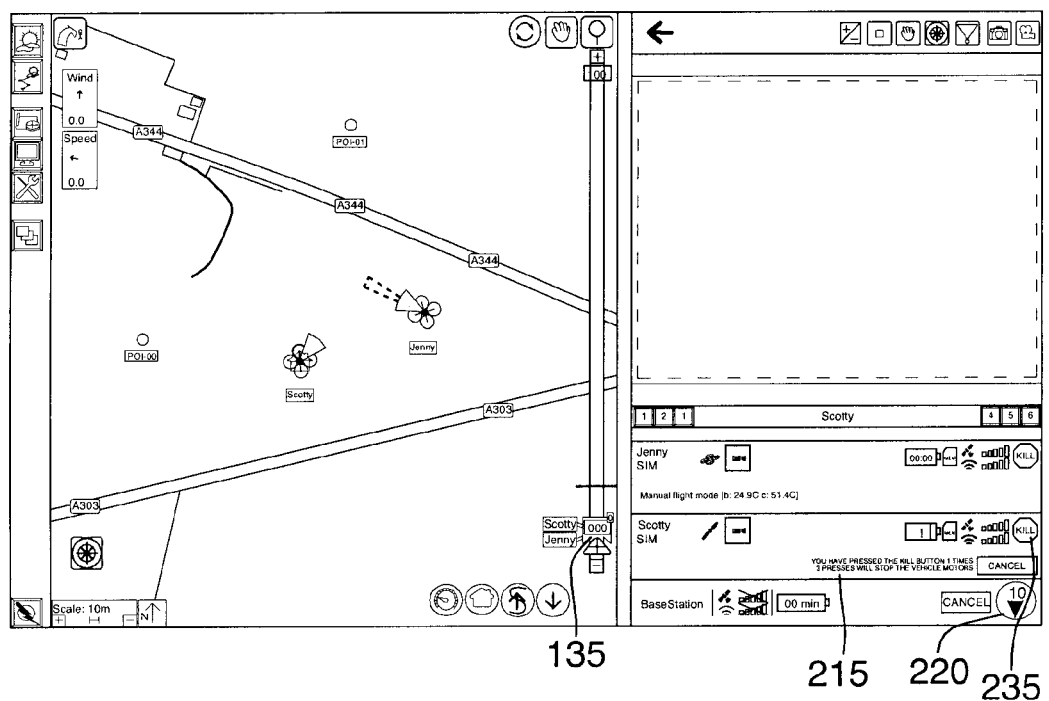

The individual stop buttons 235 in the Status Subpanels act on the specific vehicle associated with that subpanel. This button may be only visible and available to be selected once the global stop button has been pressed once (see below). On the first press of the stop button, the vehicle in question may turn off its sonar, halt its progress along the flight plan, and present a warning about its having stopped ("stopped" state). Referring to FIG. 18, which shows UAV Scotty's stop button 235 having been pressed once, it may be noted that the control station has displayed a warning in UAV Scotty's Status Subpanel 215. On the second press of the button 235, the vehicle may immediately initiate a landing procedure ("landing" state). Referring to FIG. 19, which shows UAV Scotty's stop button having been pressed twice, it may be noted that UAV Scotty's ground height indicator 135 shows a lower height than prior to the second press of the stop button (i.e. the state in FIG. 18). On the third press of the button, the vehicle may immediately powers down its motors (known as the "emergency stop" state). Referring to FIG. 20, which shows UAV Scotty's stop button having been pressed three times, it may be noted that UAV Scotty's ground height indicator 135 has dropped to zero.

In alternate embodiments of the individual stop button, one or more of these states may be eliminated, with the number of presses being re-assigned to the remaining states. Other embodiments may introduce additional or modified states, such as a "sensor stop" state (continue along any flight-plan being followed, but with the sensor or camera disabled).

The global stop button 220 acts on all vehicles. The first click on this button causes control station to instruct all vehicles to stop moving, flying with no further vertical or horizontal motion until otherwise instructed. The initial click on the global stop button also makes the individual stop buttons visible and available to be clicked in each vehicle's Status Subpanel. On each subsequent click, the following algorithm may be followed individually by each vehicle: (1) if the vehicle is in Hover position (meaning at Hover height, which is a pre-determined height from the ground, usually 1 to 2 meters), the vehicle initiates its landing procedure; (2) if the vehicle is at Pre-hover height (a larger pre-determined height from the ground, usually 10 meters) or less, but is not in Hover position, the vehicle descends into Hover position; and (3) if the vehicle is not at Pre-hover height or less, the vehicle descends by the Stop Descend height (a pre-determined height, usually 10 meters), unless such a descent would bring the vehicle to below Hover position, in which case the vehicle descends into Hover position.

Alternate embodiments for the global stop may include "emergency stop all" (wherein clicking the global stop button would act equivalently to clicking each individual stop button) or "stop, return home and land" (wherein clicking the global stop button would stop movement for all vehicles, set their individual destinations to their home base, and land upon arrival at the home base).

It will be appreciated by those skilled in the art that other variations of the embodiments described herein may also be practiced without departing from the scope of the invention. Other modifications are therefore possible.

The contents of the FIGS. 3 to 34, showing exemplary, non-limiting implementations of the present invention will now be summarized.

FIG. 3 shows the control station UI in manual flying mode, with UAVs Scotty and Jenny on the ground. Scotty is the currently selected UAV, while Jenny is the source of the video. This can be seen in the status subpanels on the lower right of the UI as well as in the map view icons: Scotty's whole status subpanel is highlighted yellow, and Scotty's icon in the map is highlighted with red, indicating that Scotty is selected for control. Jenny's status subpanel is not highlighted, but Jenny's camera icon (in the status subpanel) is highlighted, meaning that Jenny is the source for the video/images in the upper right. Jenny's icon in the map view has a green highlight for the direction that the camera is facing, which highlight indicates that Jenny's camera is the source for video, and which icon indicates the direction that the camera is facing. The ground height control indicates that both UAVs are on the ground (at height 000).

Similar to FIG. 3, FIG. 4 shows Scotty has taken off and Jenny is now selected for control (see status subpanel and map icon highlighting). Jenny's desired ground height slider control is shown being dragged up to 029 meters, while Jenny is still barely off the ground at 006 meters.

FIG. 5 follows from FIG. 4. Scotty is now once again selected for control, which switches the status subpanel and map icon highlighting again, and shows the Scotty's desired ground height control on the ground height slider.

FIG. 6 follows from FIG. 5. Only change is that Jenny is now selected for control.

FIG. 7 follows from FIG. 6. Only change is that Scotty is now the source for video (and since it doesn't have a functioning video camera in this demo, there's just black). The camera icons in the status subpanels have swapped highlighting to show this.

FIG. 8 also follows from FIG. 6. A target is placed in front of Jenny on the map.

FIG. 9 follows from FIG. 8. The source for video is switched from Jenny to Scotty. The target is still shown, as changing the video source doesn't affect that.

FIG. 10 follows from FIG. 8. With Jenny selected for control, clicking and holding on a destination creates a destination and trajectory for Jenny to move. This is the central use of manual flying mode.

FIG. 11 follows from FIG. 10. As soon as the pointer is released (ie the click is released), the destination and trajectory disappear, and UAV Jenny comes to a halt (still hovering at 13 meters, as per the ground height indicator).

Figure 12:
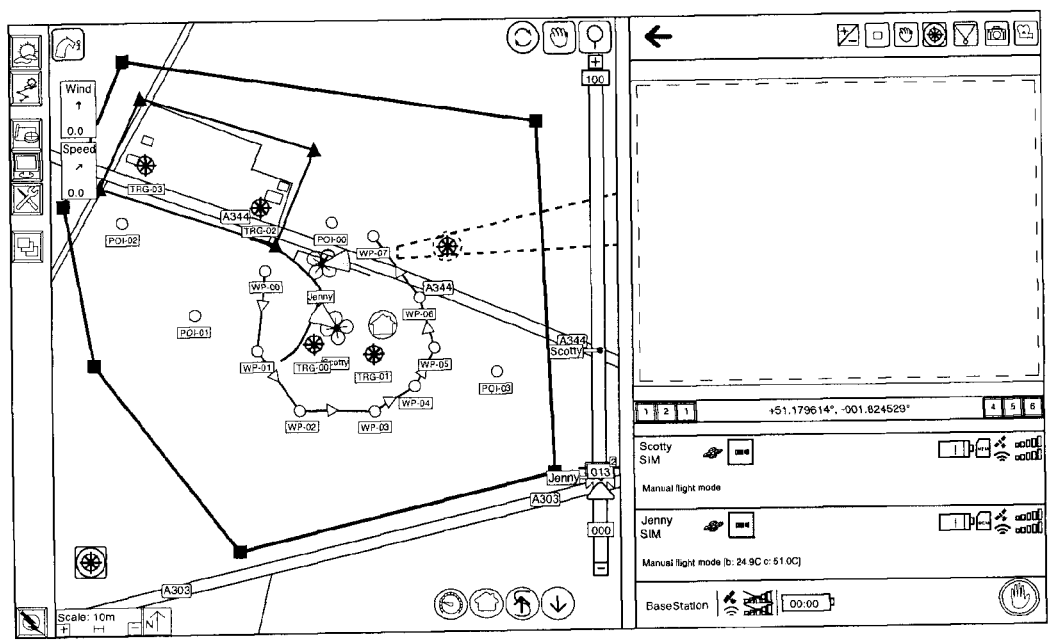

FIG. 12 shows the control station UI still in manual mode, but the map now has the flight plan built in FIGS. 22-27.

FIG. 13 follows from FIG. 12. The user has clicked the Waypoint flying mode control (2nd icon down from top left), and the system is now in Waypoint flying mode. The UAVs are hovering in stationary positions.

Figure 14:
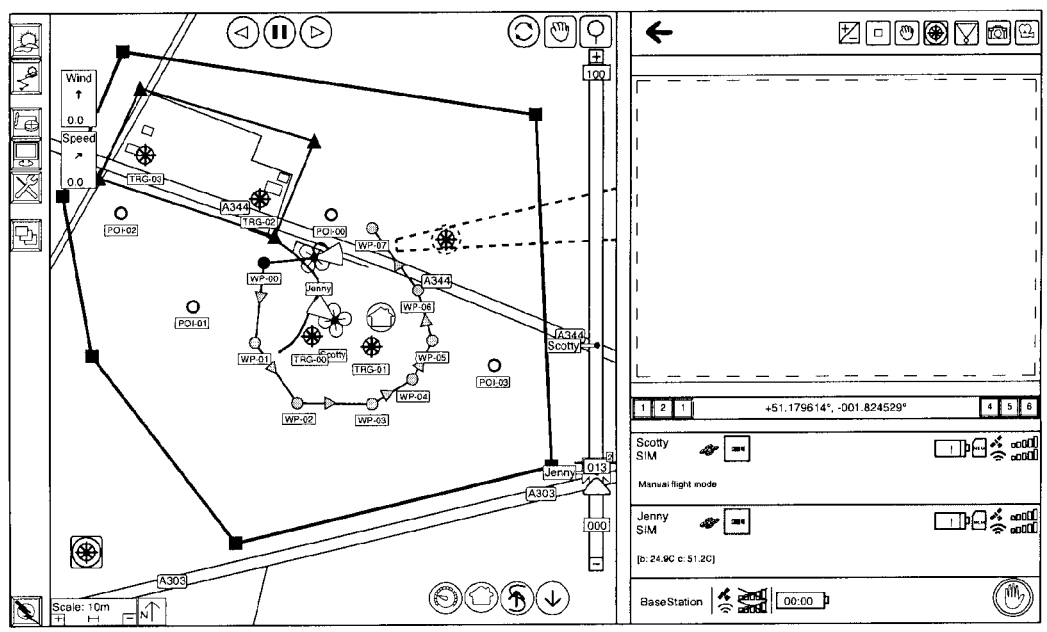

FIG. 14 follows from FIG. 13. The user has clicked on the first waypoint (WP-00) and Jenny (the currently selected UAV) is heading towards it. When it reaches the first waypoint, it by default will begin "playing" the route forward, moving through the waypoints in the direction indicated by the inter-waypoint vectors.

Figure 16:
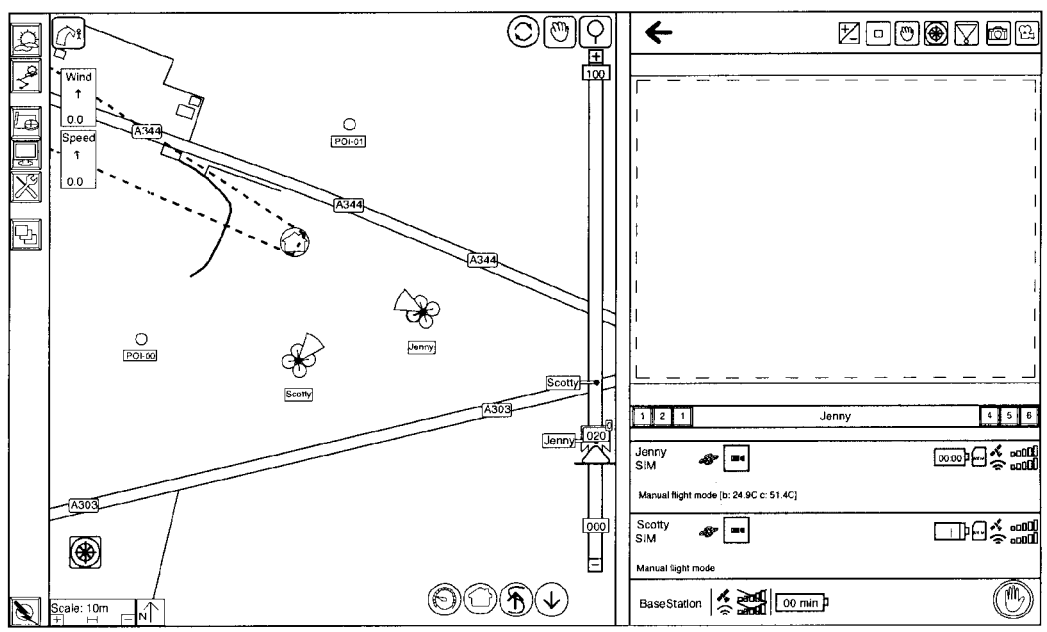

FIG. 16 shows the control station UI in manual mode with the UAVs in hovering positions.

Figure 15:
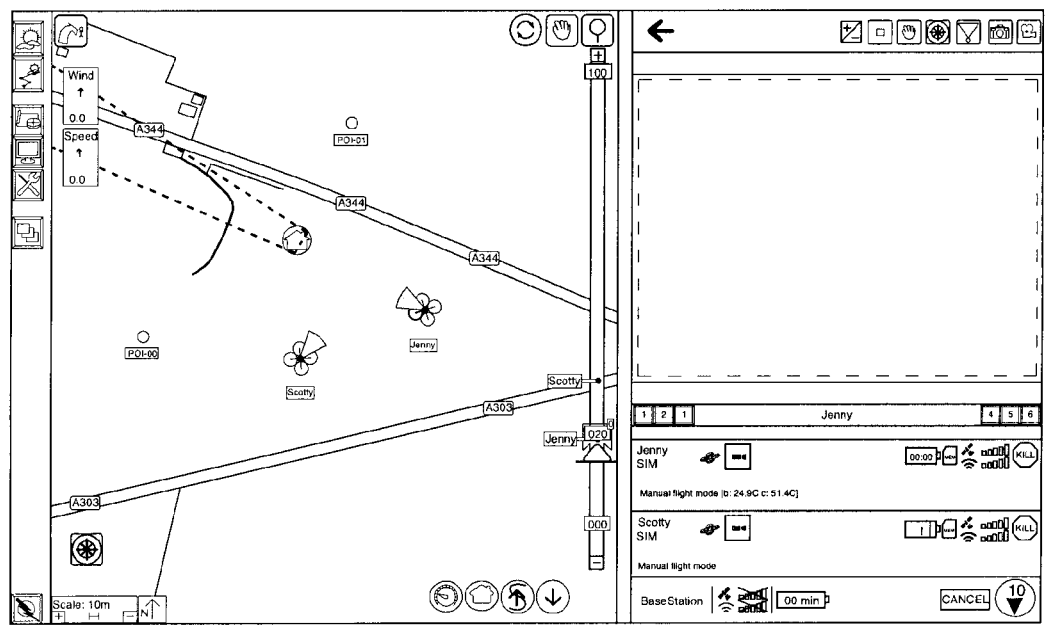

FIG. 15 follows from FIG. 16. Global Stop (at bottom right) has been pressed once resulting in all UAVs coming to a halt, and Individual stop buttons (marked "kill", in the status subpanels) are revealed.

Figure 17:
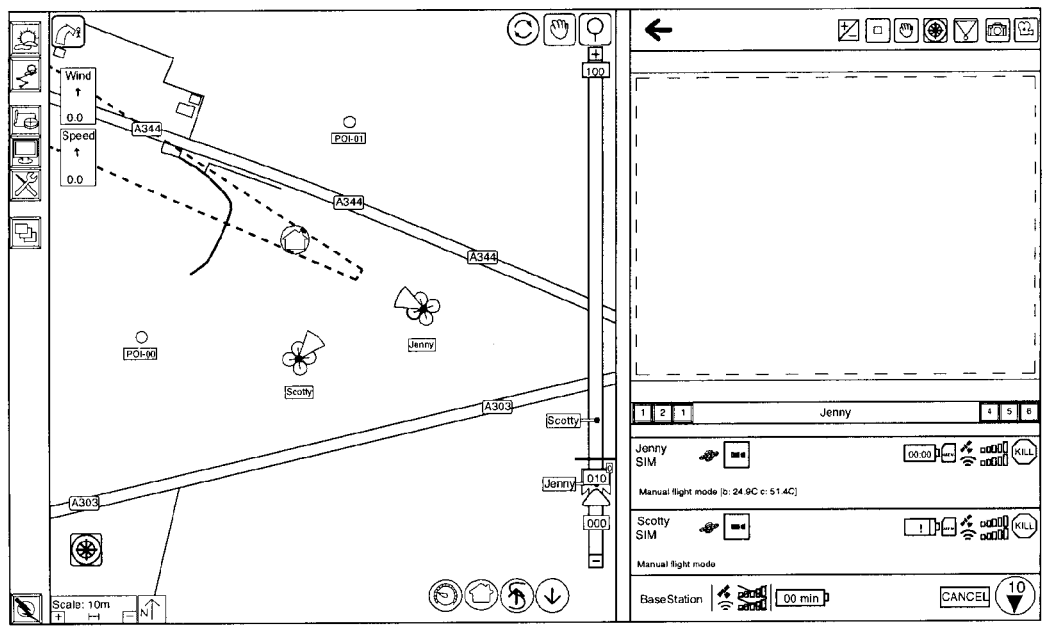

FIG. 17 follows from FIG. 15. Global Stop is pressed a second time and all UAVs descend by 10 meters.

FIG. 18 follows from FIG. 17. Individual stop ("kill") is pressed once for UAV Scotty. Sonar is turned off, and the UAV hovers at the current height. A warning is displayed in the status subpanel.

FIG. 19 follows from FIG. 18. Individual stop for UAV Scotty is pressed a second time. Scotty begins an automated landing.

FIG. 20 follows from FIG. 19. Individual stop for UAV Scotty is pressed a third time. Scotty immediately powers down all motors and falls to the ground.

Figure 21:
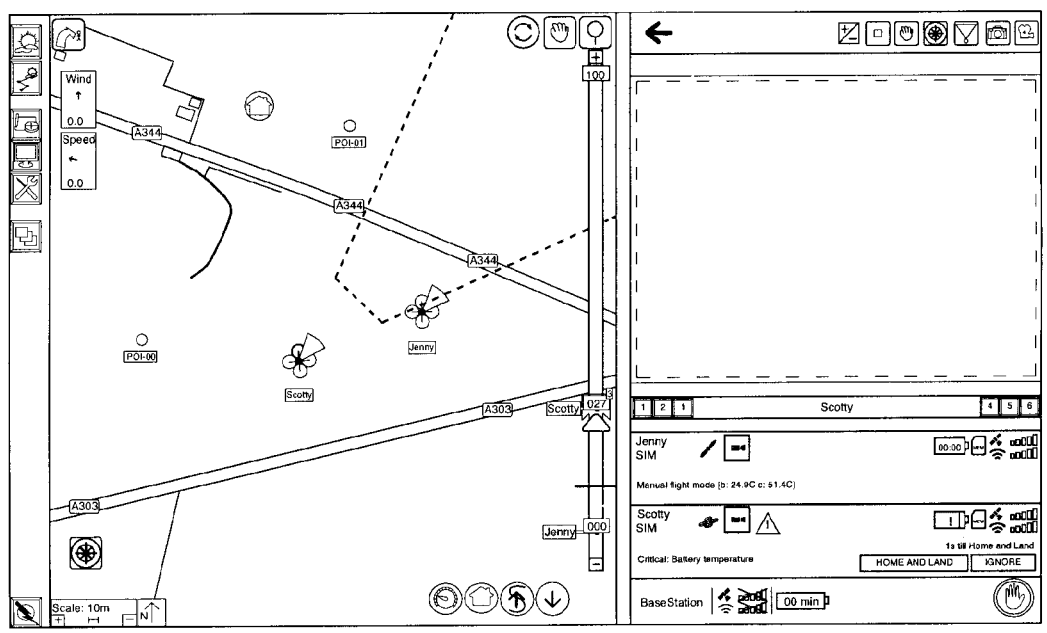

FIG. 21 shows the control station UI showing UAV Scotty encountering a critical condition during flight. A warning is displayed in the status subpanel along with "Home and land" and "Ignore" options, which cause the UAV to fly back to home base and initiate landing, or ignore the warning, respectively.

FIG. 22 follows from FIG. 11. The user has clicked the Flight Planning Mode control near the upper-left; the control is highlighted, and the UI switches into Flight Planning Mode.

FIG. 23 follows from FIG. 22. The user has clicked the Waypoint creation control; the control is highlighted, and the UI now allows the addition of waypoints.

FIG. 24 follows from FIG. 23. The user has clicked on a location on the map, and a waypoint has been added there.

Figure 25:
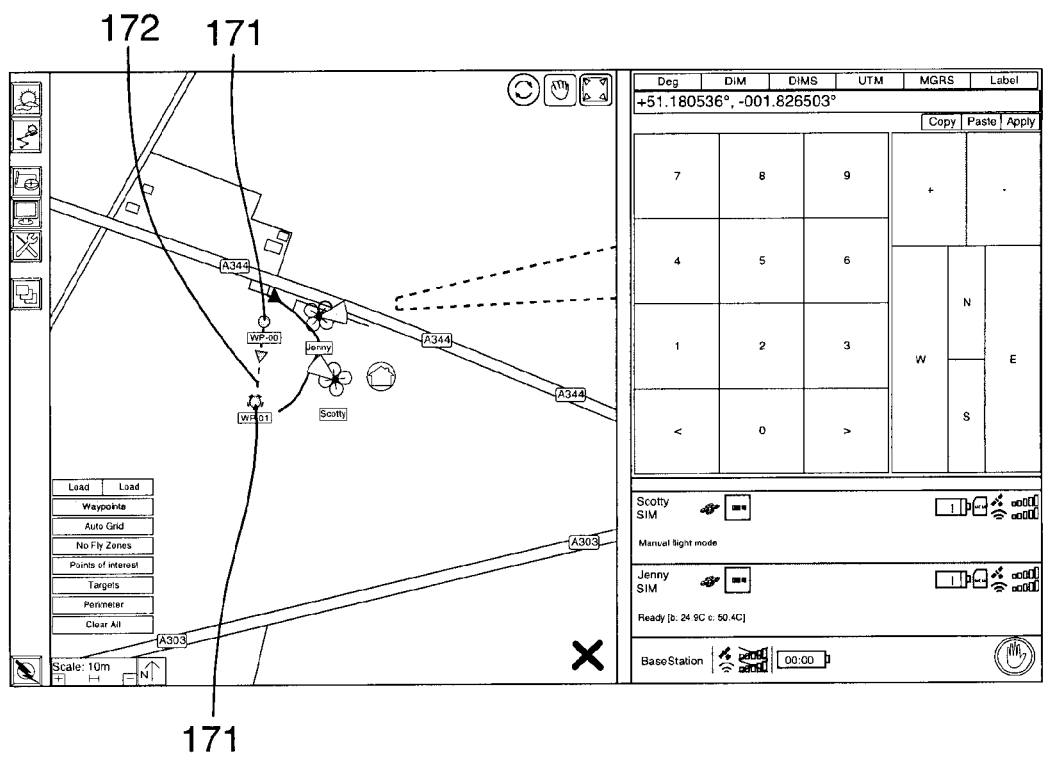

FIG. 25 follows from FIG. 24. The user has clicked on a second location on the map. A waypoint has been added there, and an inter-waypoint vector has been drawn from the previously added waypoint to the more-recently added waypoint.

Figure 26:
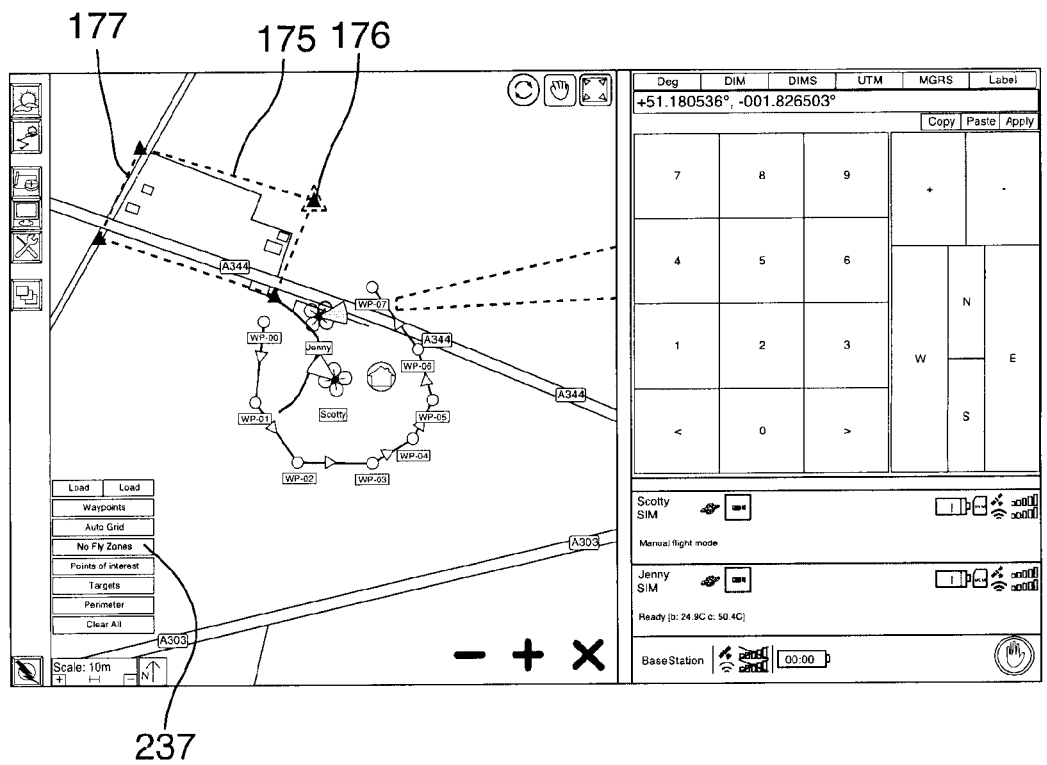

FIG. 26 follows from FIG. 25. The user has added a number of waypoints, and has then clicked the No Fly Zones creation control. Following that, the user has clicked on several locations on the map to create no-fly zone elements. The elements are joined by no-fly zone inter-element vectors which form a bounded shape that encloses the no-fly zone.

FIG. 27 follows from FIG. 26. The user has added some POIs (points of interest), some targets, and a perimeter. These are all added in a similar way to how waypoints and no-fly zones are created.

FIG. 28 follows from FIG. 14. The two UAVs have been instructed to fly through the waypoints, "playing" the route forward.

FIG. 29 follows from FIG. 28. Immediately after FIG. 28, UAV Scotty has continued playing the route forward, while UAV Jenny (the currently selected UAV) has been instructed to "play" the route in reverse through the user clicking on the Reverse icon. UAV Jenny is shown to be closer to the start of the waypoint route, while UAV Scotty is shown to be near the end of the waypoint route.

FIG. 30 shows the control station UI in Waypoint flying mode with Find Me mode turned on. UAV Jenny begins playing the waypoint route forward. With Find Me mode turned on, the currently selected UAV is always at the centre of the map.

FIG. 31 follows from FIG. 30. UAV Jenny continues playing the waypoint route forward. UAV Jenny's icon has not moved relative to the UI, but the map has shifted in the background as UAV Jenny has moved through the waypoint route.

FIG. 32 shows the control station UI in Manual flying mode with Find Me mode turned on such that the destination and trajectory indications are working differently than in regular manual flying with Find Me mode turned off, as shown in FIG. 10. The user clicks and holds a trajectory, and the UAV moves towards it. However, as the map scrolls under the destination (since the UI is in Find Me mode), the "destination" is never reached, so the control is simply a trajectory control. The UAV stops moving and hovers as soon as the user releases the click.

FIG. 33 shows the control station UI with Follow Me mode turned on. The offset to the ground station (indicated as a triangle icon south-west of UAV Jenny) is maintained, and as the ground station moves, the UAV is instructed to move to maintain that offset.

FIG. 34 follows from FIG. 33. Follow Me mode is still turned on. The ground station has moved, and UAV Jenny has moved to maintain its offset to the ground station.

Figure 36:
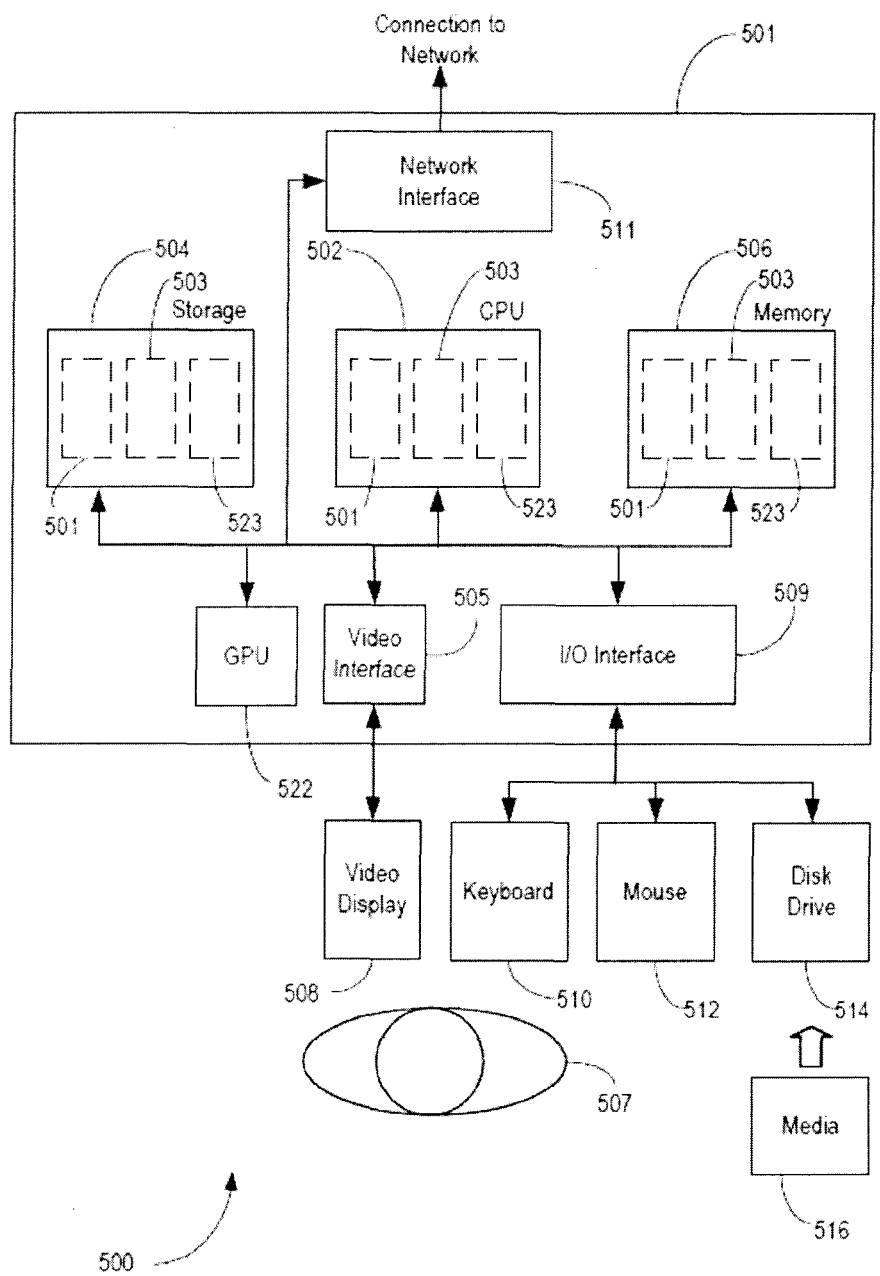
FIG. 36 illustrates a representative generic implementation of the invention.

The present system and method may be practiced in various embodiments. A suitably configured computer device, and associated communications networks, devices, software and firmware may provide a platform for enabling one or more embodiments as described above. By way of example, FIG. 36 shows a generic computer device 500 that may include a central processing unit ("CPU") 502 connected to a storage unit 504 and to a random access memory 506. The CPU 502 may process an operating system 501, application program 503, and data 523. The operating system 501, application program 503, and data 523 may be stored in storage unit 504 and loaded into memory 506, as may be required. Computer device 500 may further include a graphics processing unit (GPU) 522 which is operatively connected to CPU 502 and to memory 506 to offload intensive image processing calculations from CPU 502 and run these calculations in parallel with CPU 502. An operator 507 may interact with the computer device 500 using a video display 508 connected by a video interface 505, and various input/output devices such as a keyboard 510, mouse 512, and disk drive or solid state drive 514 connected by an I/O interface 509. In known manner, the mouse 512 may be configured to control movement of a cursor in the video display 508, and to operate various graphical user interface (GUI) controls appearing in the video display 508 with a mouse button. The disk drive or solid state drive 514 may be configured to accept computer readable media 516. The computer device 500 may form part of a network via a network interface 511, allowing the computer device 500 to communicate with other suitably configured data processing systems (not shown).

In particular, the control station 305 may be implemented by computer device 500, which may communicate with the ground stations 360 and the UAVs 325. Communications may occur over a wireless network, such as an ad-hoc 802.11b/g link (optionally employing wireless encryption through WEP or WPA). Where no ground station is present, the control station 305 may communicate directly to the UAVs 325 over the wireless network. If a ground station is present, the control station 305 may communicate with the ground station wirelessly as well, and the ground station may relay communications from the control station 305 to the UAVs 325. Communications between ground station 360 and UAVs may be via a 900 MHz proprietary protocol for increased range. Using this protocol, an approximate maximum range of communication between control station 305 and UAV 325 or ground station 360 and UAV 325 is 15 km. Other wireless communication protocols and networks may also be used, including satellite communications, which may have different maximum communication ranges. The communication range may also be affected by the type or elevation of terrain over which the wireless communications must travel. When employing the 900 MHz proprietary protocol for communication, security features, including encryption, may also be enabled.

Maximum vertical separation between the control station 305 or ground station 360 and UAVs 325 may depend upon both the capabilities of the wireless communications, as described, and on the available battery power in the respective UAV 325. A minimum amount of battery power may be required for the UAV 325 to perform a controlled descent back to the ground. Controlling descent may consume more battery power depending on wind, terrain, and other factors. It is preferable that the UAV 325 be configured with a battery of sufficient capacity to allow for a controlled descent from at least approximately a 500*m*.

Each UAV 325 may comprise operations control (e.g. a computer running a multitasking operating system), flight control (to handle wind compensation, individual rotor speeds, etc), navigation control (to keep track of current location via GPS, creating a velocity vector from the current location to the destination, correcting if the UAV drifts off course), camera(s) (hardware module, software interface, image capture, video stream encoding), sensor(s) (sonar for ground height, atmospheric sensors for air pressure, GPS hardware for location tracking, any payload sensors that may be attached) and Communications (802.11 link to ground station, 900 MHz modem link to ground station).

In manual flying mode, the control station 305 may send a ground velocity vector to the UAV 325. The UAV 325 (with its GPS and onboard sensors) manages orientation, motor speeds, wind compensation, etc, and flies in the direction and speed specified.

In waypoint flying mode, the control station 305 may send a ground location (as GPS coordinates) to the UAV 325. The UAV 325 (with its GPS and onboard sensors, and with pre-defined settings like maximum velocity, etc) calculates (and regularly recalculates) the necessary velocity vector to reach the target coordinates.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A method of remotely controlling operation of a plurality of unmanned aerial vehicles ("UAVs"), performed by a computing device, the method comprising:
    receiving real-time vehicle status data from the plurality of UAVs, the vehicle status data comprising vehicle location data and vehicle flight elevation data;
    receiving real-time location data from a target communication device, wherein the target communication device comprises a ground station;
    displaying at least a subset of the received vehicle status data for each of the plurality of UAVs in a single interface, the displaying comprising providing a graphical representation of the respective vehicle location data of each of the plurality of UAVs and a graphical indication of the ground elevation of each of the plurality of UAVs based at least partly on the respective flight elevation data in the single interface, wherein the graphical indication of the ground elevation of each of the plurality of UAVs includes a ground height control slider, the control slider including icons corresponding to each of the plurality of UAVs, wherein a location of each icon in the control slider corresponds to the ground elevation of a corresponding UAV, and wherein the control slider further includes icons corresponding to a desired elevation of each of the plurality of UAVs;
    receiving a control command input associated with at least one of the plurality of UAVs having vehicle status data displayed in the single interface, the control command input received through the single interface, wherein the control command input comprises instructions for maintaining at least one flight path that follows movement of the target communication device; and transmitting the instructions to the respective at least one of the plurality of UAVs.

2. The method of claim 1 wherein the control command input comprises instructions for maintaining a distance between the respective at least one of the plurality of UAVs and the target communication device.

3. The method of claim 1 wherein sliding an icon corresponding to one of the plurality of UAVs in the control slider causes the instructions to include a change of the desired elevation of the one of the plurality of UAVs.

4. The method of claim 3 wherein the change of the desired elevation comprises a change of relative elevation of the one of the plurality of UAVs with respect to at least one other of the plurality of UAVs.

5. The method of claim 1 comprising receiving a real-time video stream from at least one of the plurality of UAVs; and displaying the real-time video stream received from the at least one of the plurality of UAVs in the single interface based at least partly on a received video stream selection input.

6. The method of claim 5 wherein the received video stream selection input is received through the single interface.

7. The method of claim 6 wherein the received video stream selection input is independent of the control command input.

8. The method of claim 5 wherein the real-time video stream is associated with a camera attached to the respective UAV.

9. The method of claim 8 wherein the control command input comprises orienting the camera of the respective UAV towards an identified location.

10. The method of claim 1 wherein the at least one of the plurality of UAVs comprises a grouping of the plurality of UAVs having vehicle status data displayed in the single interface.

11. The method of claim 10 comprising determining a corresponding flight control command for each UAV of the grouping based at least partly on the instructions; and for each determined corresponding flight control command, transmitting the respective determined corresponding flight control command to the respective UAV.

12. The method of claim 11 wherein the determined corresponding flight control command comprises spacing each UAV of the grouping from each other UAV of the grouping.

13. The method of claim 11 wherein each UAV comprises a camera, the control command input comprises an identification of a location, and each respective determined corresponding flight control command comprises orienting each respective UAV camera towards the identified location.

14. The method of claim 1, comprising receiving a UAV group selection instruction identifying a grouping of the plurality of UAVs, wherein the instructions are associated with each UAV of the grouping; and transmitting the instructions to each UAV of the grouping.

15. The method of claim 1 wherein the control command input comprises an identification of a flight waypoint, the transmitting comprising instructing the respective UAV to fly to the identified flight waypoint.

16. The method of claim 15 wherein the control command input comprises an identification of a second flight waypoint, the transmitting comprising instructing the respective UAV to fly to the identified second flight waypoint upon reaching the identified flight waypoint.

17. The method of claim 16 wherein the control command input comprises a flight direction, the flight direction instructing the respective UAV to fly to each respective waypoint in order of transmittal to the respective UAV.

18. The method of claim 16 wherein the control command input comprises a flight direction, the flight direction instructing the respective UAV to fly to each respective waypoint in reverse order of transmittal to the respective UAV.

19. The method of claim 1 wherein the control command input comprises an instruction to hover at a current location.

20. The method of claim 19 comprising receiving a second control command input comprising a second instruction to resume a previous flight path, and transmitting the second instruction to the respective UAV.

21. The method of claim 1, wherein receiving real-time vehicle status data from the plurality of UAVs comprises receiving a current position for the respective one of the plurality of UAVs, wherein receiving real-time location data from a target communication device comprises receiving a current position for the target communication device, wherein the method further comprises:
  calculating an offset distance between the current position of the respective one of the plurality of UAVs and the current position of the target communication device;
  determining that a current offset distance between the respective one of the plurality of UAVs and the target communication device is different than the calculated offset distance; and
  transmitting an additional instruction to the respective one of the plurality of UAVs to move in such a way to maintain the calculated offset distance.

22. A non-transitory computer program product tangibly embodying code that, when executed by a processor of a computing device, causes the processor to:
  receive real-time vehicle status data from a plurality of unmanned aerial vehicles ("UAVs"), the vehicle status data comprising vehicle location data and vehicle flight elevation data;
  receive real-time location data from a target communication device, wherein the target communication device comprises a ground station;
  display at least a subset of the received vehicle status data for each of the plurality of UAVs in a single interface, the displaying comprising providing a graphical representation of the respective vehicle location data of each of the plurality of UAVs and a graphical indication of the ground elevation of each of the plurality of UAVs based at least partly on the respective flight elevation data in the single interface, wherein the graphical indication of the ground elevation of each of the plurality of UAVs includes a ground height control slider, the control slider including icons corresponding to each of the plurality of UAVs, wherein a location of each icon in the control slider corresponds to the ground elevation of a corresponding UAV, and wherein the control slider further includes icons corresponding to a desired elevation of each of the plurality of UAVs;
  receive a control command input associated with at least one of the plurality of UAVs having vehicle status data displayed in the single interface, the control command input received through the single interface, wherein the control command input comprises instructions for maintaining at least one flight path that follows movement of the target communication device; and
  transmit the instructions to the respective at least one of the plurality of UAVs.

23. A system comprising a computing device configured to:

receive real-time vehicle status data from a plurality of unmanned aerial vehicles ("UAVs"), the vehicle status data comprising vehicle location data and vehicle flight elevation data;

receive real-time location data from a target communication device, wherein the target communication device comprises a ground station;

display at least a subset of the received vehicle status data for each of the plurality of UAVs in a single interface, the displaying comprising providing a graphical representation of the respective vehicle location data of each of the plurality of UAVs and a graphical indication of the ground elevation of each of the plurality of UAVs based at least partly on the respective flight elevation data in the single interface, wherein the graphical indication of the ground elevation of each of the plurality of UAVs includes a ground height control slider, the control slider including icons corresponding to each of the plurality of UAVs, wherein a location of each icon in the control slider corresponds to the ground elevation of a corresponding UAV, and wherein the control slider further includes icons corresponding to a desired elevation of each of the plurality of UAVs;

receive a control command input associated with at least one of the plurality of UAVs having vehicle status data displayed in the single interface, the control command input received through the single interface, wherein the control command input comprises instructions for maintaining at least one flight path that follows movement of the target communication device; and transmit the instructions to the respective at least one of the plurality of UAVs.

* * * * *